April 16, 1940.                W. P. PLACE                2,197,414
                               SIGNAL SYSTEM
                          Filed Aug. 3, 1938              6 Sheets-Sheet 1

INVENTOR
Willard P. Place.
BY
HIS ATTORNEY

April 16, 1940.   W. P. PLACE   2,197,414
SIGNAL SYSTEM
Filed Aug. 3, 1938   6 Sheets-Sheet 3

INVENTOR
Willard P. Place
BY
HIS ATTORNEY

April 16, 1940.  W. P. PLACE  2,197,414

SIGNAL SYSTEM

Filed Aug. 3, 1938  6 Sheets-Sheet 4

INVENTOR
Willard P. Place.
BY
HIS ATTORNEY

INVENTOR
Willard P. Place
BY
HIS ATTORNEY

April 16, 1940.     W. P. PLACE     2,197,414
SIGNAL SYSTEM
Filed Aug. 3, 1938     6 Sheets-Sheet 6
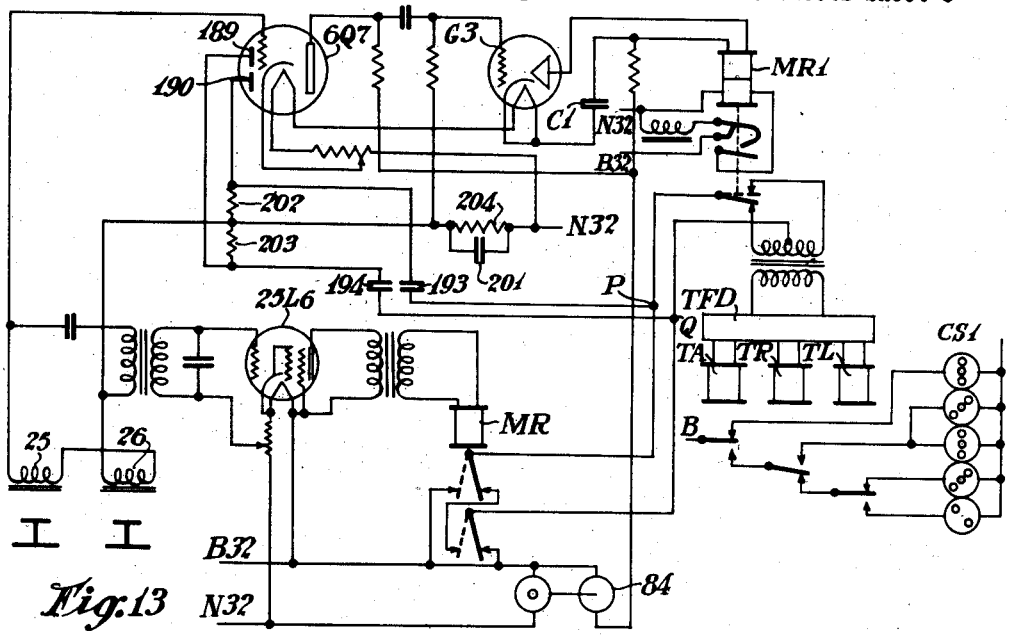
Fig. 13
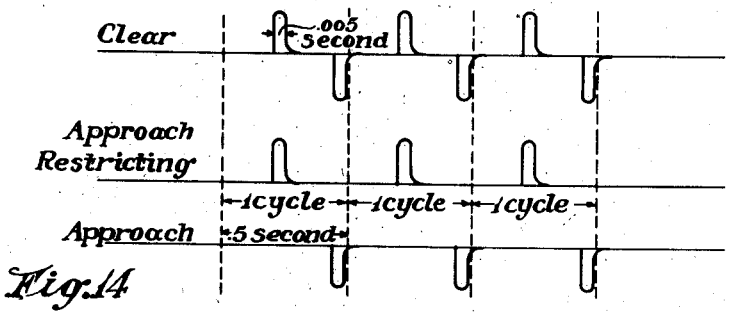
Fig. 14
Fig. 15
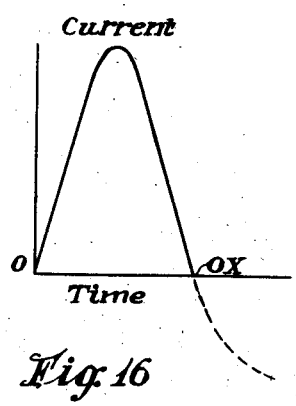
Fig. 16
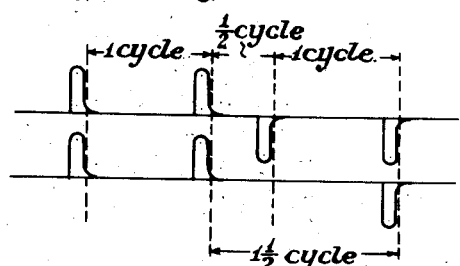
Fig. 17
INVENTOR
Willard P. Place.
BY
HIS ATTORNEY Patented Apr. 16, 1940

2,197,414

UNITED STATES PATENT OFFICE 2,197,414

SIGNAL SYSTEM

Willard P. Place, Wilkinsburg, Pa., assignor to The Union Switch & Signal Company, Swissvale, Pa., a corporation of Pennsylvania Application August 3, 1938, Serial No. 222,883

13 Claims. (Cl. 246—63)

My invention relates to signal systems, and more particularly to signal systems for railways.

I shall describe several forms of apparatus embodying my invention, and shall then point out the novel features thereof in claims.

A feature of my invention is the provision in signal systems of the type here contemplated of novel and improved means effectively responsive to recurrent impulses of current. Another feature of my invention is the provision of novel and improved means for restoring an electron tube of the controlled ionization type to a normal non-conductive condition subsequent to an impulse of electromotive force which renders the tube conductive. Still another feature of my invention is the provision in signal systems of the type here involved of novel and improved receiving and decoding means which is selectively responsive to the polarity of code impulses of a signal current. Again, a feature of my invention is the provision in such signal systems of automatic switching means for selectively rendering active one or the other of two receiving means operating in parallel, one of such receiving means being selectively responsive to code impulses of direct current and the other being selectively responsive to coded alternating current. Other features and advantages of my invention will appear as the specification progresses.

Figure 1:
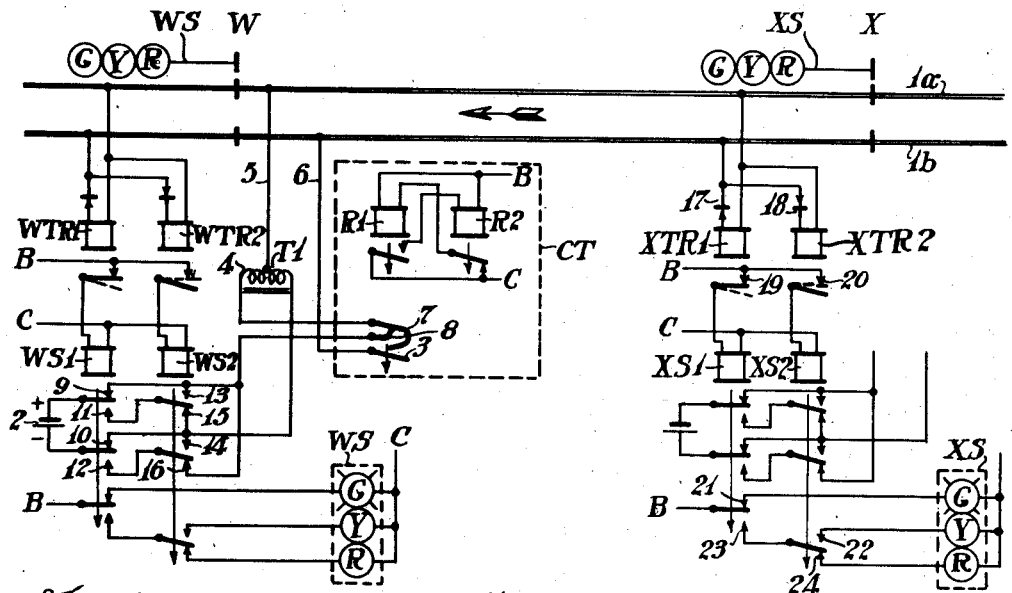
Figure 2:
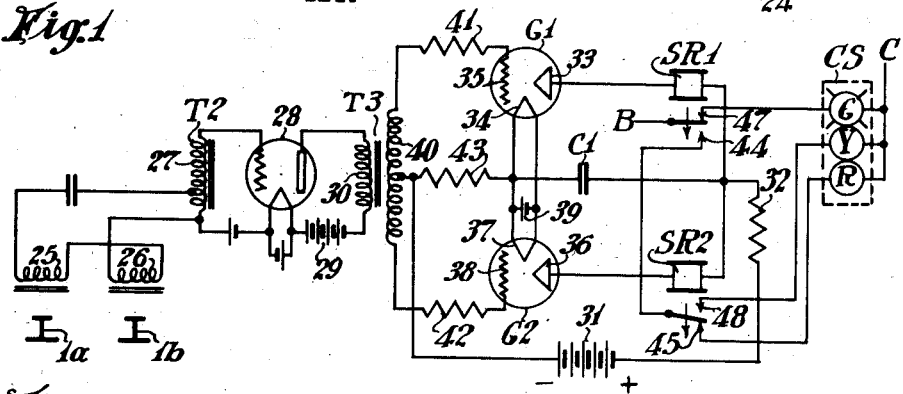
Figure 3:
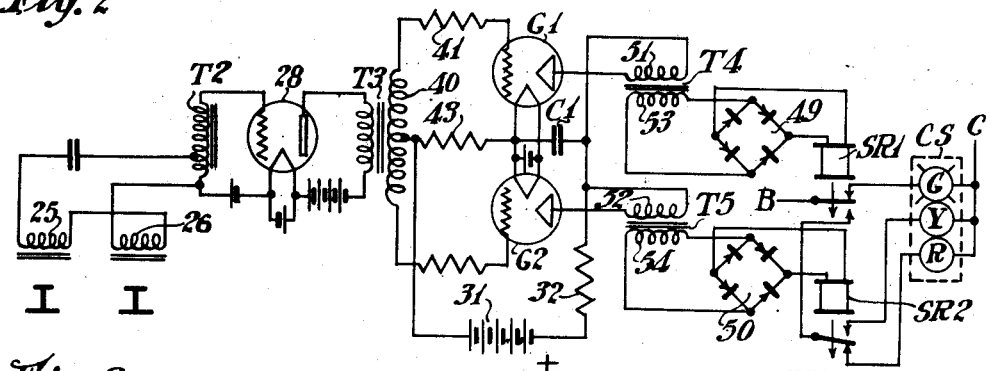
Figure 4:
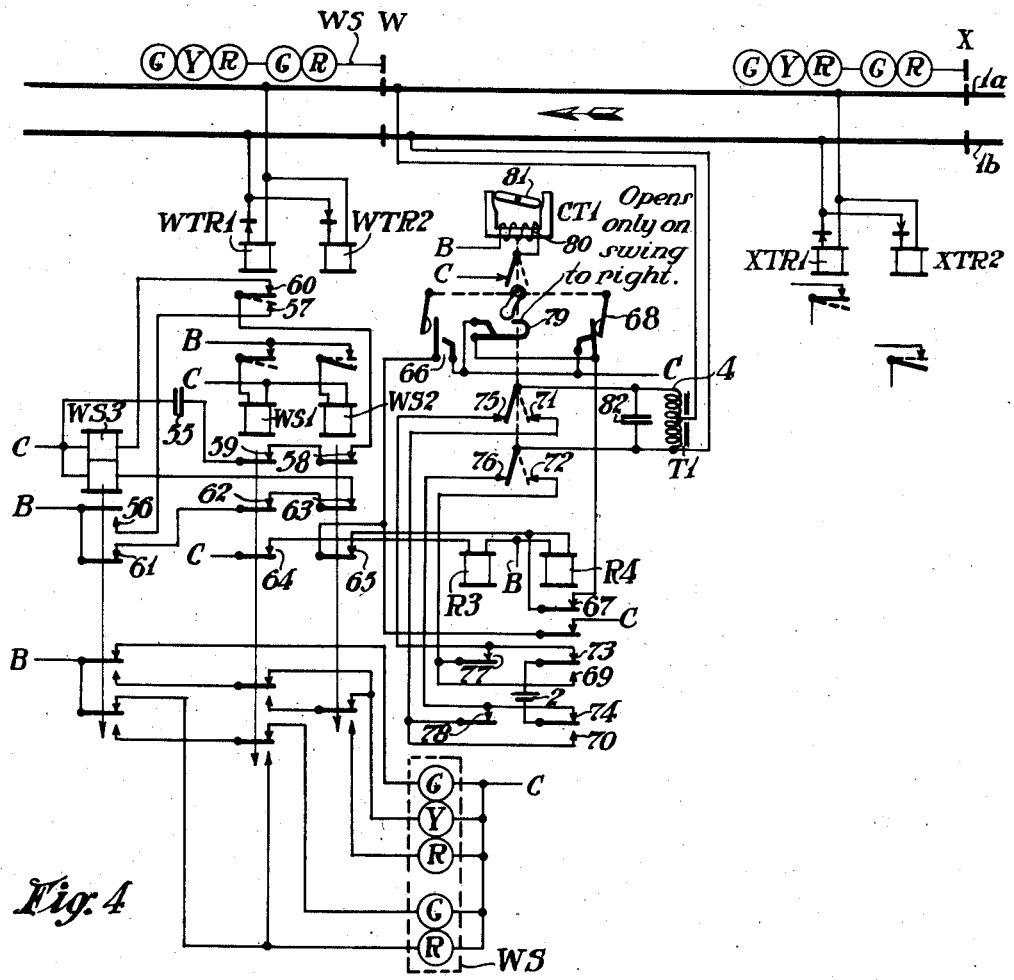
Figure 5:
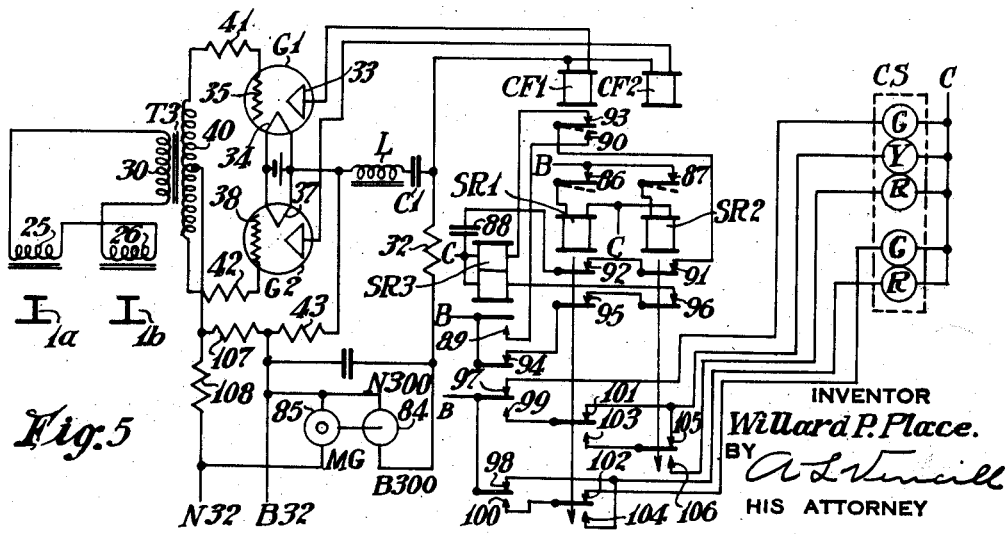
Figure 10:
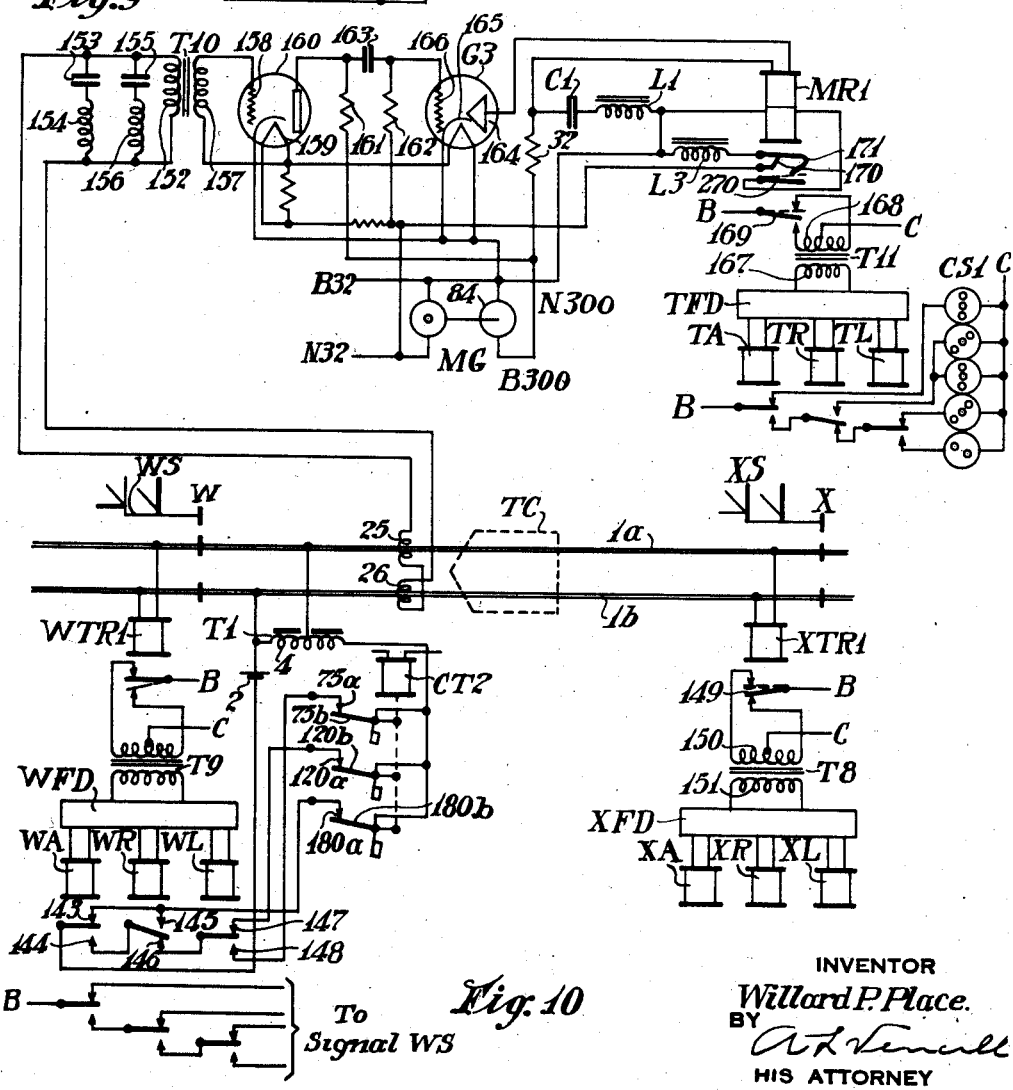
Figure 11:
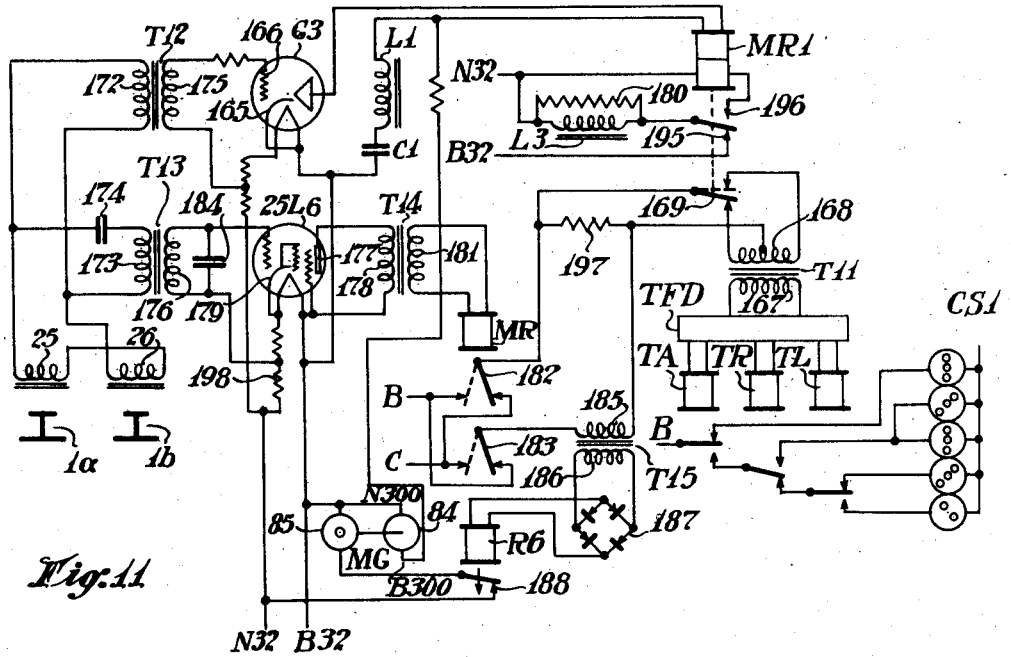
Figure 12:
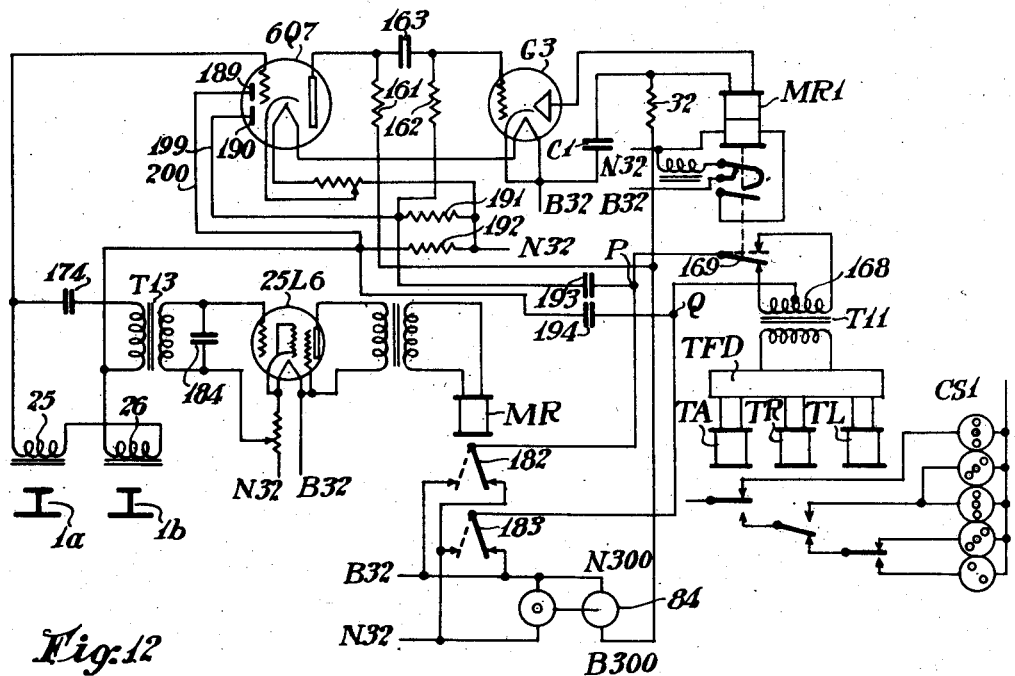

In the accompanying drawings, Figs. 1 and 2 are diagrammatic views of trackway apparatus and train-carried apparatus, respectively, of one form of apparatus embodying my invention when applied to a three indication signal system for railways. Fig. 3 is a diagrammatic view of a modified form of the train-carried apparatus of Fig. 2, and which also embodies my invention. Figs. 4 and 5 are diagrammatic views of trackway apparatus and train-carried apparatus, respectively, of another form of apparatus embodying my invention when applied to a four indication signal system for railways. Figs. 6, 7, 8 and 9 are diagrammatic views of different modifications of the train-carried apparatus of Fig. 5 and each of which modifications embodies the invention. Fig. 10 is a diagrammatic view of still another form of trackway and train-carried apparatus embodying my invention when applied to a four indication signal system for railways. Figs. 11, 12 and 13 are different forms of train-carried apparatus embodying my invention when applied to signal systems for railways, and each form of which train-carried apparatus comprises two receiving means operating in parallel one responsive to code impulses on direct current and the other responsive to coded alternating current. Fig. 14 is a diagram illustrating the different code impulses supplied by the trackway apparatus of Fig. 1 and Fig. 4. Figs. 15 and 16 are diagrams illustrating operating characteristics of the train-carried apparatus of Figs. 2, 3, 5, 6, 7, 8, 9, 10, 11, 12 and 13. Fig. 17 is a diagram illustrating an operating characteristic of the trackway apparatus of Fig. 4.

In each of the several views like reference characters are used to designate similar parts.

It is to be understood, of course, that I do not wish to limit my invention to signal systems for railways, and this one application will serve to illustrate the many places where apparatus embodying the invention will be useful.

Referring to Fig. 1, the reference characters $1a$ and $1b$ designate the track rails of a stretch of railway over which traffic normally moves from right to left as indicated by an arrow, and which rails are formed by the usual insulated rail joints into consecutive track sections of which only one section W—X and the adjoining ends of the two adjacent sections are shown for the sake of simplicity. Each track section is provided with a track circuit comprising the track rails, means for supplying code impulses of direct current connected across the rails at the exit end of the section, and a code responsive relay means connected across the rails at the entrance of the section. Thus the source of current impulses for the track circuit of section W—X and the code responsive relay means for the track circuit for the section to the left, that is, the track section next in advance of section W—X, are located adjacent the junction W of these two track sections. The means for supplying such code impulses of direct current to the track circuit of section W—X is governed by the relay means for the track circuit for the section next in advance, and comprises a battery 2, a code transmitter CT and a track transformer or reactor T1.

The code transmitter CT comprises a pair of slow acting relays R1 and R2 which are energized from a suitable source of current having terminals B and C. Relay R1 controls the energization of relay R2 over a front contact, and relay R2 controls the energization of relay R1 over a back contact in a manner which is obvious from the drawing. Consequently, as long as current continues to be supplied from the source B—C, relays R1 and R2 will continue to operate at a rate which is determined by the retardation period of these two relays. In this manner, intermittent or coding operations of a contact finger 3 of relay R1 are obtained, the contact finger 3 being the front contact member of a continuity transfer type of contact. Obviously, the two relays R1 and R2 can be replaced by any suitable type of code transmitter, the essential requirement being that the contact finger 3 operates periodically at a desired rate. The rate may, for the purposes of illustration, be assumed to be of the order of 60 times per minute.

A portion of the winding 4 of transformer T1 is connected with the rails of section W—X over wires 5 and 6, contact finger 3 and the transfer contact 7 being interposed in wire 6. The full winding 4 of transformer T1 is connected with battery 2 over back contact 8 and transfer contact 7 of relay R1, and contact fingers of relays WS1 and WS2 of the code responsive relay means of the track circuit of the section next in advance of section W—X. At such time as relay WS1 is picked up closing its front contacts 9 and 10; or relay WS1 is released closing its back contacts 11 and 12, and relay WS2 is picked up closing front contacts 13 and 14, the positive terminal of battery 2 is connected with the left-hand terminal of winding 4 and the negative terminal of battery 2 is connected with the right-hand terminal of winding 4. Again, when relay WS1 is released to close back contacts 11 and 12, and relay WS2 is released to close its back contacts 15 and 16, the connection of battery 2 with the winding 4 is reversed as will be apparent by an inspection of Fig. 1.

It follows that under clear traffic conditions in advance of section W—X so that relay WS1 is picked up in a manner to later appear, or under approach traffic conditions in advance so that relay WS1 is released and relay WS2 is picked up as will later appear, recurrent impulses of direct current of positive polarity are supplied to the track circuit of section W—X to effect clear traffic conditions for that section, but that when traffic conditions in advance of section W—X are such that both relays WS1 and WS2 are released, recurrent impulses of direct current of negative polarity are supplied to the track circuit for section W—X to effect approach traffic conditions for that section. The trackway apparatus thus far described in Fig. 1 is similar to that described and claimed in the copending application for United States Letters Patent, Serial No. 60,240, filed January 22, 1936, by W. P. Place and A. J. Sorensen, for Railway signaling apparatus. As fully explained in the aforementioned application Serial No. 60,240, each time the contact 7—8 of relay R1 is closed energy is stored in the magnetic circuit of the transformer T1, and each time the contact 7—8 is opened and contact 3—7 is closed, the magnetic energy rapidly collapses and causes to flow in the track circuit of section W—X a relatively short current impulse having a relatively high peak voltage, the polarity of the impulse being governed by the position of the relays WS1 and WS2 associated with the track circuit of the section next in advance. Referring to Fig. 14, such relatively short high peak voltage impulses are represented by the center and lower diagrams, the center diagram indicating that the impulses are of positive polarity and the lower diagram indicating that the impulses are of negative polarity. However, it is to be noted that in the form of the invention disclosed by Figs. 1, 2 and 3, recurrent impulses of positive polarity are used to reflect clear traffic conditions in advance, recurrent impulses of negative polarity are used to reflect approach traffic conditions in advance, and no such current impulses reflect the stop or slow speed traffic conditions.

Referring again to Fig. 1, the code responsive relay means for the track circuit of section W—X includes two code following relays XTR1 and XTR2, which are connected across the track rails in parallel and are made selectively responsive to the polarity of the track circuit current impulses by asymmetric units 17 and 18, the unit 17 being disposed to pass only current impulses of positive polarity to relay XTR1 and unit 18 being disposed to pass only current impulses of negative polarity to the relay XTR2. The relay XTR1 controls over front contact 19 a slow release repeater relay XS1 and the relay XTR2 controls over front contact 20 a slow release repeater relay XS2. Thus when recurrent impulses of positive polarity are supplied to the track circuit of section W—X, the relay XTR1 is operated once for each impulse and the relay XS1 is intermittently energized and is continuously picked up due to its slow release period being sufficient to retain relay XS1 energized from one impulse to the next. Similarly, when current impulses of negative polarity are supplied to the track circuit of section W—X, the relay XTR2 is operated and the relay XS2 is continuously picked up. When the section W—X is occupied and the track circuit is shunted both relays XTR1 and XTR2 are inactive and both relays XS1 and XS2 are released at the end of their slow release periods.

In Fig. 1, a wayside signal is provided for each section, the signals being here shown as of the three indication color light type. Looking at signal XS for section W—X, the green lamp G is illuminated to display a clear signal when the track circuit for section W—X is supplied with current impulses of positive polarity and the relay XS1 is picked up closing front contact 21. When the track circuit for section W—X is supplied with current impulses of negative polarity so that relay XS2 is picked up closing front contact 22, and relay XS1 is released closing back contact 23 the yellow lamp Y at signal XS is illuminated to display an approach signal. When both relays XS1 and XS2 are released because the track section W—X is occupied the R lamp of signal XS is illuminated over back contacts 23 and 24 to display a stop signal.

The relays XS1 and XS2 also control the supply of current to the track circuit for the section to the right of section W—X in the same manner as the relays WS1 and WS2 control the current impulses supplied to the track circuit of track section W—X. Furthermore, relays WS1 and WS2 are controlled by the track circuit for the section next in advance of section W—X through the medium of code following relays WTR1 and WTR2 in the same manner that relays XS1 and XS2 are controlled by the code following relays XTR1 and XTR2. Also, the relays WS1 and WS2 control the operating circuit for the signal WS in the same manner as the relays XS1 and XS2 control the operating circuit for the signal XS. It will be understood, of course, that each consecutive track section of the system is provided with trackway apparatus similar to that described in connection with the section W—X.

Referring to Fig. 2, the train-carried apparatus includes an inductor comprising two windings 25 and 26 mounted on the train in inductive relation with the track rails 1a and 1b, respectively, and connected across a portion of the winding 27 of an input transformer T2. The connections of windings 25 and 26 are preferably such that the electromotive forces induced therein by current flowing in opposite directions in the rails 1a and 1b add their effects. The winding 27 of transformer T2 is included in the grid circuit of an amplifier electron tube 28, the plate circuit of which tube includes a source of current 29 and the primary winding 30 of a coupling transformer T3. It is clear that electromotive forces induced in the windings 25 and 26 are amplified in the usual manner by the tube 28 and are reproduced in the winding 30 of the transformer T3 where they are effective to induce corresponding electromotive forces in the secondary winding 40 of transformer T3.

The train-carried apparatus is provided with two electron tubes G1 and G2 of the controlled ionization type and each of which is provided with two principal electrodes and a control electrode. As here shown the tubes G1 and G2 are "thyratrons," the tube G1 being provided with an anode 33, a filament or cathode 34 and a control grid 35; and the tube G2 being provided with an anode 36, a filament or cathode 37 and a control grid 38. The filaments 34 and 37 are heated by a battery 39 in the usual manner. The grid 35 of tube G1 is connected with the upper outside terminal of the secondary winding 40 of transformer T3, and the grid 38 of tube G2 is connected with the lower outside terminal of winding 40, a resistor 41 being preferably interposed in the connection to grid 35 and a resistor 42 being preferably interposed in the connection to grid 38. A center or mid terminal of winding 40 is connected with the filaments 34 and 37 over a resistor 43. A suitable source of direct current, such as a battery 31, has its positive terminal connected through a resistor 32 with the anodes 33 and 36, the winding of a relay SR1 being interposed between resistor 32 and anode 33 of tube G1, and the winding of a relay SR2 being interposed between resistor 32 and the anode 36 of tube G2. The negative terminal of battery 31 is connected with the filaments or cathodes 34 and 37 of the tubes by being connected between resistor 43 and the center terminal of winding 40. It is to be noted, therefore, that the tubes G1 and G2 are connected in the so-called push-pull arrangement. A condenser C1 is connected between the filaments 34 and 37 and the terminal of resistor 32 common to the windings of both relays SR1 and SR2. The parts are so proportioned that the condenser C1 and the inductance of the winding of relay SR1 form an oscillatory circuit for the tube G1 and the condenser C1 and the inductance of the winding of relay SR2 form an oscillatory circuit for the tube G2. The condenser C1 is preferably of relatively large capacity.

The parts are so proportioned that when no electromotive forces are applied to grids 35 and 38 through the transformer T3, the tubes G1 and G2 are non-conducting, and the condenser C1 is charged at a voltage substantially equal to that of battery 31. Under such non-conducting condition of tubes G1 and G2 both relays SR1 and SR2 are deenergized and released. The relays SR1 and SR2 are slow releasing in character and control the operating circuit of a cab signal CS in a manner to shortly appear.

Assuming the train on which the apparatus of Fig. 2 is mounted enters the track section W—X of Fig. 1 from the right under clear traffic conditions in advance so that current impulses of current of positive polarity are supplied to the track circuit for section W—X, electromotive forces are induced in the windings 25 and 26 by each such current impulse, such electromotive forces adding their effects. The resultant electromotive force is amplified by tube 28 and induces a corresponding electromotive force in winding 40 of transformer T3. The wave form of such induced electromotive force is substantially as illustrated by the first, third and fifth curves of Fig. 15 reading from the left, since the track circuit current impulses are all of positive polarity. That is to say, the wave form of the electromotive force induced in the winding 40 of transformer T3 in response to each current impulse of the track circuit comprises a first half cycle of positive polarity of relatively high peak voltage and a second cycle of negative polarity of a much lower peak voltage. The parts are so adjusted and connected that the electromotive force induced in winding 40 in response to a track circuit current impulse of positive polarity causes during its first half cycle the upper terminal of winding 40 to be positive with respect to the lower terminal of winding 40 with the result that the grid 35 of tube G1 is rendered positive in potential with respect to cathode 34, and the grid 38 of tube G2 is rendered negative in potential with respect to its cathode 37. This positive potential of grid 35 with respect to the cathode 34 effects ionization for tube G1 and tube G1 becomes conductive, but tube G2 remains non-conductive due to the grid 38 being negative in potential with respect to cathode 37.

When tube G1 becomes conductive, condenser C1 discharges through the oscillatory circuit consisting of the winding of relay SR1, anode-cathode space of tube G1 and back to condenser C1. This being an oscillatory circuit the current wave takes the form illustrated in Fig. 16, the current rising to a maximum value, dropping off to zero, and then tending to reverse and recharge the condenser at opposite polarity. The point O of Fig. 16 represents the point at which tube G1 becomes conductive, the point OX represents the point at which the flow of current from condenser C1 is reduced to substantially zero due to the constants of the oscillatory circuit. The parts are so chosen that the time lapsing from point O to point OX is of the order of, say, one-tenth second or sufficient for operation of a direct current relay of the usual type. When condenser C1 begins to lose its charge, current is supplied from battery 31 through resistor 32, winding of relay SR1, anode-cathode space of tube G1, resistor 43 and back to battery 31. The resistors 32 and 43 and condenser C1 are so proportioned that condenser C1 on discharging supplies a substantial portion of the total current with the result that when the oscillatory discharge from condenser C1 falls to zero or at least to a relatively low value the current flowing through tube G1 falls to a value not sufficient to maintain the tube conductive, and the tube G1 deionizes and becomes non-conductive. In other words, the "over-discharge" of condenser C1 tends to force the anode of tube G1 negative giving the tube G1 a chance to fully deionize.

It is to be noted that when tube G1 becomes conductive the voltage of condenser C1 is expended on the circuit including winding of relay SR1 and the tube G1. This removes practically all of the normal voltage from the tube G2 which is non-conductive and makes it virtually impossible for tube G2 to ionize. Also, that part of the anode current of tube G1 supplied from battery 31 creates a potential drop across resistor 43 which establishes a negative grid bias for the tubes. This bias has no influence on the tube G1 which is conductive but does serve to make it very difficult for tube G2 to ionize, so that during the immediately following or second half cycle of the electromotive force induced in the winding 40, and which half-cycle is of negative polarity so that the lower terminal of winding 40 is positive with respect to the upper terminal of winding 40, the tube G2 is maintained non-conductive.

With tube G1 rendered non-conductive the condenser C1 is quickly recharged so that the next impulse of track circuit current causes the above described operation to be repeated.

It follows that the relay SR1 is periodically energized by the recurrent impulses of current produced in the anode circuit of tube G1 in response to the recurrent impulses of current of the track circuit of section W—X. The relay SR1 is slow releasing in character and remains picked up from one impulse to the next so that lamp G of the cab signal CS is steadily illuminated to display a clear signal by virtue of the circuit completed at front contact 47 of relay SR1.

Assuming that when the train enters the track section W—X approach traffic conditions in advance exist and recurrent impulses of current of negative polarity are supplied to the track circuit for section W—X, the wave form of the electromotive force induced in winding 40 in response to each such track circuit current impulse of negative polarity is obviously opposite to that produced by the impulses of positive polarity and the wave forms are substantially as illustrated by the second, fourth and sixth curves of Fig. 15. This time, the lower terminal of winding 40 is first positive with respect to the upper terminal of the winding and the grid 38 of tube G2 is made positive in potential with respect to its filament 37 while the grid 35 of tube G1 is made negative in potential with respect to its filament. Ionization is now effected in tube G2 and tube G2 is made conducting. Condenser C1 discharges through the oscillatory circuit comprising winding of relay SR2 and the anode-cathode space of tube G2. The circuit constants for the circuits associated with tube G2 are the same as those for the circuits for tube G1 and condenser C1 provides a substantial portion of the anode current for tube G2 so that when the discharge of condenser C1 falls to a relatively low value the current flowing through the tube G2 is insufficient to maintain the tube conductive and the tube G2 deionizes and is restored to its normal non-conducting condition. The tube G1 is maintained non-conducting during the second half cycle of the wave form of the induced electromotive force in substantially the same manner as tube G2 is maintained non-conducting during the second half cycle of the wave form of the induced electromotive force when the track circuit current impulses are of positive polarity. Condenser C1 is quickly recharged when the tube G2 is restored to its non-conducting condition and the operation is repeated on the next impulse of the track circuit current. Relay SR2 is thus intermittently energized in response to the track circuit current impulses of negative polarity and remains picked up from one impulse to the next due to its slow release characteristic. When relay SR2 picks up closing its front contact 48 and relay SR1 is released closing its back contact 44, the yellow lamp Y of the cab signal CS is illuminated to display an approach signal.

In the event the track section W—X is already occupied by a train when the train on which the apparatus of Fig. 2 is mounted enters the section from the right, the first train shunts the track circuit current away from the second train and no electromotive forces are induced in the windings 25 and 26. The tubes G1 and G2 are immediately restored to their non-conducting condition and relays SR1 and SR2 are both released at the end of their slow release periods closing back contacts 44 and 45 so that the lamp R of the cab signal CS is illuminated to display a slow speed signal.

It is to be seen therefore that the apparatus in Fig. 2 is selectively responsive to recurrent impulses of direct current of positive and negative polarity through the medium of the tubes G1 and G2. The condenser C1 and its associated oscillatory circuit is effective to deionize the tube G1 or G2, as the case may be, subsequent to each impulse of electromotive force that renders the tube G1 or G2 conducting. Also, the condenser C1 and the anode circuit of either tube when made conductive so control the anode potential and the grid potential of the other tube that the latter tube is maintained non-conductive.

It is to be noted that such relatively high peak voltage of track circuit current impulses causes, when the track rails are shunted by a train, high surges of current of many amperes for inducing electromotive forces in the train-carried inductor windings 25 and 26. It is possible therefore that the stage of amplification including tube 28 will not be required, the tubes G1 and G2 operating directly from the electromotive forces induced in the windings 25 and 26.

The train-carried apparatus of Fig. 3 is similar to that of Fig. 2 except a transformer T4 and a full-wave rectifier 49 are interposed between the winding of relay SR1 and the anode circuit of tube G1, and a transformer T5 and a full-wave rectifier 50 are interposed between the winding of relay SR2 and the anode circuit of tube G2. The inductance of primary winding 51 of transformer T4 and the inductance of primary winding 52 of transformer T5 are in each case so proportioned that when a track circuit current impulse causes the tube G1 or G2 to be conductive in the manner described in Fig. 2, the discharge of condenser C1 of Fig. 3 takes the form of an oscillatory discharge and the tube G1 or G2, as the case may be, is rendered non-conducting subsequent to each such impulse that causes the tube to be conductive. When the track circuit current impulses are of positive polarity and tube G1 is rendered intermittently conductive, the recurrent impulses of current caused in the primary winding 51 of transformer T4 induce electromotive forces in the secondary winding 53 of transformer T4 which when rectified by rectifier 49 are effective to energize the relay SR1. In a like fashion when tube G2 is rendered intermittently conductive in response to track circuit current impulses of negative polarity, the recurrent impulses of current flowing in the primary winding 52 of transformer T5 induce electromotive forces in the secondary winding 54 of that transformer which when rectified by rectifier 50 are effective to energize the relay SR2. The relays SR1 and SR2 of Fig. 3 control the circuits for the cab signal CS in the same manner as described in Fig. 2. It is clear, therefore, that the train-carried apparatus of Fig. 3 is operated by the trackway apparatus of Fig. 1 in substantially the same manner as the apparatus of Fig. 2.

Referring to Fig. 4, the track rails 1a and 1b of a stretch of railway over which traffic normally moves in the direction indicated by an arrow are formed by insulated rail joints into consecutive track sections the same as in Fig. 1, the section W—X and the adjoining ends of the two adjacent sections only being shown in Fig. 4 for the sake of simplicity. Each track section is provided with a track circuit comprising the track rails, a source of recurrent code impulses of direct current and a code responsive relay means the same as in Fig. 1, except in Fig. 4 additional trackway apparatus is provided to supply at times impulses of current that are alternately positive and negative. As illustrated in Fig. 14, clear traffic conditions in advance of track section W—X of Fig. 4 are reflected by current impulses alternately positive and negative in polarity, approach restricting traffic conditions are reflected by current impulses of positive polarity, approach traffic conditions are reflected by current impulses of negative polarity, and stop or slow speed traffic conditions are reflected by the absence of any such impulses. It should be noted that there are twice as many impulses per minute transmitted for clear traffic conditions as for either approach restricting or approach traffic conditions.

In Fig. 4, the code transmitter is modified to transfer from the supply of positive impulses of the approach restricting indication to the supply of negative impulses of the approach indication or vice versa in a specified sequence. Furthermore, as shown at the left-hand end of Fig. 4, the code responsive relay means for the track circuit for the section next in advance of section W—X includes code following relays WTR1 and WTR2 and repeater relays WS1 and WS2, the same as in Fig. 1, and in addition a third repeater relay WS3, the relay WS3 being used to avoid undesirable signal flashing in changing from one indication to another.

Assuming at the start that the relays WS1, WS2 and WS3 are all deenergized and that clear traffic conditions exist for the section next in advance of section W—X so that the current impulses supplied to the track circuit for the section next in advance are alternately positive and negative in polarity and the first impulse is one of positive polarity, the relay WTR1 is operated and the relay WS1 is energized. The next impulse is of negative polarity and relay WTR2 is operated and relay WS2 is energized, relay WS1 remaining picked up by virtue of its slow release period. A condenser 55 is charged over a circuit including battery terminal B, back contact 56 of relay WS3, and back contact 57 of relay WTR1, front contacts 58 and 59 of relays WS2 and WS1, respectively, condenser 55 and terminal C. The next impulse of track circuit current is of positive polarity and relay WTR1 is picked up to again energize relay WS1. The condenser 55 now discharges through a winding of relay WS3 and relay WS3 is picked up, the circuit including condenser 55, front contacts 59 and 58, front contact 60 of relay WTR1, top winding of relay WS3 and to condenser 55. From this point on relay WS3 is maintained energized over a stick circuit including its lower winding and front contact 61, and front contacts 62 and 63 of relays WS1 and WS2, respectively. It follows that relay WS3 is picked up only in response to three impulses of track circuit current of alternate polarity, but when picked up it remains picked up as long as the track circuit current impulses are alternate in polarity. As shown in the lower left-hand portion of Fig. 4, the operating circuits for a four indication color light wayside signal WS for the section next in advance of section W—X are governed by the relays WS1, WS2 and WS3. These operating circuits will be readily understood by an inspection of Fig. 4 and need not be described in detail since they form no part of my invention. This relay combination is similar to that disclosed and claimed in the copending United States application for Letters Patent Serial No. 217,944, filed July 7, 1938, by A. J. Sorensen.

The code responsive relay means for the track circuit for section W—X and for the other track circuits of the system are substantially the same as described in detail for the track circuit of the section next in advance of section W—X.

The means for supplying code impulses of current to the track circuit for the section W—X of Fig. 4 comprises battery 2, track transformer T1, a code transmitter CT1 and two relays R3 and R4, relays R3 and R4 acting to pole change the connection of battery 2 with the winding 4 of transformer T1 in accordance with traffic conditions in advance. Relay R3 is controlled over a simple circuit including front contact 64 of relay WS1. Relay R4 is controlled by a pick-up circuit including front contact 65 of relay WS2 and a cam operated contact 66 of code transmitter CT1, and also over a stick circuit including its own front contact 67 and two cam operated contacts 68 and 79 of the code transmitter in multiple as will shortly be described.

Assuming the section next in advance of W—X is occupied so that both relays WS1 and WS2 are released, then both relays R3 and R4 are deenergized. Under this condition the battery 2 is connected across the winding 4 of transformer T1 over back contacts 69 and 70 of relay R4, and the right-hand code contacts 71 and 72 of the code transmitter, the connection being such that the resultant current impulses supplied through transformer T1 to the track circuit for section W—X are of negative polarity to reflect approach traffic conditions for the section W—X. When approach traffic conditions exist in advance and relay WS2 is picked up closing front contact 65 the relay R4 is picked up in a manner to shortly appear. Battery 2 is now connected across winding 4 over front contacts 73 and 74 of relay R4 and the left-hand code contacts 75 and 76 of the code transmitter, the connection being opposite to that previously described so that the track circuit for section W—X is now supplied with code impulses of current of positive polarity to reflect approach restricting traffic conditions for the section W—X. When approach restricting traffic conditions exist in advance and relay WS1 is picked up, the relay R3 is energized and relay R4 is released. Battery 2 is now connected across winding 4 over back contacts 69 and 70 of relay R4 and the right-hand code contacts 71 and 72 to supply the track circuit of section W—X with impulses of negative polarity, and battery 2 is also connected across the winding 4 over back contacts 69 and 70 of relay R4, front contacts 77 and 78 of relay R3 and the left-hand code contacts 75 and 76 to supply the track circuit with impulses of positive polarity. Thus the track circuit of section W—X is now supplied with impulses of current alternately of positive and negative polarity to reflect clear traffic conditions in the section W—X. Again when clear traffic conditions exist in advance and both relays WS1 and WS2 are picked up to energize both relays R3 and R4, the battery 2 is reversibly connected across the winding 4 as will be evident from Fig. 4 so that impulses of current alternately of positive and negative polarity are supplied to the track circuit for section W—X to reflect clear traffic conditions.

In changing from approach restricting to approach or vice versa it is preferable to do so in a selected sequence so that the first impulse of reversed polarity appears in one-half of the usual cycle interval. If the time is extended to one and one-half cycle intervals a false signal flash may result. For example, if traffic conditions change from approach to approach restricting and relay R4 is energized and picked up at the instant the code transmitter CT1 happens to be changing from the right-hand contacts 71 and 72 to the left-hand contacts 75 and 76 no effective impulse would be transmitted the first time left-hand contacts 75 and 76 are closed, and there will be an interval of substantially one and one-half cycles before an impulse of positive polarity appears in the track circuit of section W—X. Again when traffic conditions change from approach restricting to approach it will be undesirable to release relay R4 when the code transmitter is changing from left-hand contacts 75 and 76 to the right-hand contacts 71 and 72, or no effective impulse would be supplied for an interval of substantially one and one-half cycle period. Such long delay between impulses is illustrated by the lower diagram of Fig. 17. To effect a proper sequence in the changing from approach restricting to approach condition or vice versa, as illustrated by the top diagram of Fig. 17, the code transmitter CT1 is provided with cam operated contacts 66, 68 and 79, which function to allow relay R4 to pick up or release only during a particular part of the cycle of the code transmitter.

The code transmitter may be of any convenient type such, for example, as disclosed in the United States Letters Patent No. 1,913,826, granted June 13, 1933, to H. G. Blosser for Oscillating motors. It is sufficient for the instant application to say that as long as the current source whose terminals are B and C continues to supply current to the winding 80 of the code transmitter CT1 the armature 81 is oscillated at a predetermined rate to alternately close the right-hand contacts 71 and 72 and the left-hand contacts 75 and 76, as well as to operate the cam operated contacts 66, 68, and 79 once for each cycle. Relay R4 is picked up over a circuit from terminal B, through winding of relay R4, front contact 65 of relay WS2, cam operating contact 66 and terminal C, and contact 66 is closed only during that part of the cycle of the code transmitter CT1 during which the right-hand contacts 71 and 72 are closed. Hence relay R4 can be energized only when the right-hand contacts 71 and 72 are closed so that when on the next half cycle of the transmitter CT1 the left-hand contacts 75 and 76 are closed an impulse of current of positive polarity is supplied to the track circuit of section W—X.

Relay R4 is retained energized over its stick circuit including terminal B, winding of relay R4, front contact 67 and cam operated contacts 68 and 79 in parallel. Thus if relay WS2 is released in response to a change in traffic conditions relay R4 is not released until such time as both contacts 68 and 79 are open. Contact 79 is directional and opens only on the swing to the right of each cycle, that is, during the instant the transfer is being made from right-hand contacts 71 and 72 to left-hand contacts 75 and 76. Contact 68 is opened only during the interval the left-hand contacts 75 and 76 are open. It follows that relay R4 is released closing back contacts 69 and 70 so that when the right-hand contacts 71 and 72 of the code transmitter are next closed an impulse of current is supplied to the track circuit of section W—X. It is to be seen, therefore, that with the code transmitter CT1 constructed in the manner just described it is possible to transfer from approach restricting to approach or vice versa only during the proper instant in the operating cycle of the code transmitter. A condenser 82 may be connected across the winding 4 of the transformer T1 to increase the peak voltage of the impulse, it being recalled that the impulses of direct current supplied to the track circuit are each of relatively short duration and of relatively high peak voltage. The means for supplying code impulses to each of the other track circuits of the system is substantially the same as just described in detail for the track circuit for section W—X.

The arrangement of a track transformer or reactance device including a winding mounted on a magnetic core and a condenser connected across such winding and the winding connected across the track rails for supplying current impulses to the associated track circuit when direct current supplied to such winding is interrupted is disclosed and claimed in my copending application Serial No. 239,523, filed November 8, 1938, for Signal systems.

Referring to Fig. 5, the train-carried apparatus adaptable of operation with the trackway apparatus of Fig. 4 includes two tubes G1 and G2, the same as in Fig. 2. In Fig. 5 the primary winding 30 of the transformer T3 is connected directly with the windings 25 and 26 of the train-carried inductor, although a stage of amplification may be interposed in this connection if desired. The tubes G1 and G2 operate the slow releasing relays SR1 and SR2 through code following relays CF1 and CF2, respectively, relays SR1 and SR2 functioning as slow acting repeater relays. Also, a third repeater relay SR3 is provided for the train-carried apparatus for substantially the same reason as the relay WS3 is included in the apparatus of Fig. 4. In Fig. 5, the generator 84 of a motor generator MG serves as the source of electromotive force for the anode circuits of tubes G1 and G2, the motor 85 of the motor generator MG being supplied with current from any convenient source such as the headlight generator whose terminals are B32 and N32. The generator 84 whose terminals are designated B300 and N300 would, for example, supply a voltage of, say, 300 volts. In Fig. 5, an inductor L is connected in series with the condenser C1 so that the oscillatory circuits associated with tubes G1 and G2 comprise inductor L, condenser C1 and the winding of relay CF1 in the case of tube G1; and inductor L, condenser C1 and the winding of relay CF2 in the case of tube G2. Resistors 32 and 43 are interposed in the anode circuit the same as in Fig. 2, while two resistors 107 and 108 are connected with the grid circuits to provide a desired grid bias for the tubes from the source B32—N32.

The repeater relay SR1 is controlled over a front contact 86 of the code following relay CF1 and the repeater relay SR2 is controlled over front contact 87 of the code following relay CF2. Repeater relay SR3 is controlled in substantially the same manner as relay WS3 of Fig. 4. Starting with the relays SR1, SR2 and SR3 all deenergized and assuming that relay CF1 is first operated closing front contact 86 to energize relay SR1, and then relay CF2 is operated closing front contact 87 to energize relay SR2, a condenser 88 is charged over a circuit from terminal B, back contact 89 of relay SR3, back contact 90 of relay CF1, front contacts 91 and 92 of relays SR2 and SR1, respectively, condenser 88 and terminal C. When relay CF1 is next picked up closing its front contact 93 the condenser 88 discharges through the top winding of relay SR3 and that relay is picked up. Relay SR3 then remains energized as long as the relays SR1 and SR2 remain picked up over the stick circuit including terminal B, front contact 94 of relay SR3, front contacts 95 and 96 of relays SR1 and SR2, respectively, lower winding of relay SR3 and terminal C.

In describing the operation of the apparatus of Figs. 4 and 5 I shall assume that the train on which the apparatus of Fig. 5 is mounted enters track section W—X of Fig. 4 from the right under clear traffic conditions so that the track circuit of section W—X is supplied with recurrent impulses of current alternately positive and negative in polarity as illustrated by the top diagram of Fig. 14. I shall further assume that the train-carried relays are at the start all deenergized and the first track circuit current impulse is one of positive polarity so that the wave form of the electromotive force induced in the winding 40 of transformer T3 is substantially that illustrated by the first curve of Fig. 15 reading from the left. During the first half cycle of such electromotive force the top terminal of winding 40 is positive with respect to the lower terminal and grid 35 of tube G1 is rendered positive in potential with respect to its filament and tube G1 ionizes and becomes conductive. With tube G1 conductive, the condenser C1 discharges through winding of relay CF1, anode-filament space of tube G1 and inductor L. As explained in connection with Figs. 2 and 16 the discharge of condenser C1 is oscillatory, the current rising to a maximum and then decreasing and tending to reverse. When the current from condenser C1 starts to decrease, current flows from the generator 84 through the anode circuit of tube G1 and which circuit includes resistors 32 and 43 as well as the winding of relay CF1. As previously explained in connection with Fig. 2 the condenser C1 supplies the major portion of the current flowing in tube G1 so that when the discharge from condenser C1 falls to a relatively low value the current flowing through tube G1 is insufficient to maintain the tube ionized and the tube G1 becomes deionized and is restored to its non-conductive condition. Furthermore, the tube G2 is maintained non-conducting during the second half cycle of this induced electromotive force for substantially the same reason as described in detail in connection with Fig. 2, and it is believed the description need not be repeated. The impulse of current produced in the anode circuit of tube G1 operates the relay CF1 and the repeater relay SR1 is energized and picked up since the duration of the impulse flowing through tube G1 is of sufficient period to permit the relay SR1 to pick up.

Condenser C1 is quickly recharged subsequent to the restoring of tube G1 to its non-conductive condition. The next impulse of track circuit current is of negative polarity and the electromotive force induced in the winding 40 has a wave form substantially as illustrated by the second curve of Fig. 15. As the lower terminal of winding 40 is first positive with respect to the upper terminal the grid 38 of tube G2 is made positive in potential with respect to its filament. Tube G2 is ionized and becomes conductive. The operation following the ionization of tube G2 is substantially the same as that described in connection with tube G1 except the code following relay CF2 is operated and the repeater relay SR2 is picked up. This time tube G1 is maintained non-conductive during the second half cycle of the wave form in substantially the same manner as described in connection with Fig. 2. Condenser 88 is charged in response to the picking up of relays SR1 and SR2 as previously explained. The next or third impulse of track circuit current is of positive polarity and tube G1 is again made conductive so that relay CF1 is operated to supply an energizing impulse to the relay SR1. With relay CF1 picked up closing front contact 93 the condenser 88 discharges to pick up the relay SR3 as previously explained. From this point on the track circuit impulses alternately of positive and negative polarity cause the tubes G1 and G2 to become alternately conductive and the relays CF1 and CF2 to be alternately operated, the tubes G1 and G2 being restored subsequent to each impulse through the medium of the condenser C1 and its associated oscillatory circuits. Alternate operation of relays CF1 and CF2 to periodically energize relays SR1 and SR2 retains these relays picked up and the third repeater relay SR3 is energized and picked up over its stick circuit. The relay SR3 controls over its front contacts 97 and 98 the circuits for the G lamp of the top group of lamps of the cab signal CS, and the R lamp of the bottom group of lamps so that the cab signal CS now displays a clear signal.

If approach restricting traffic conditions exist for section W—X when the train enters that section, the recurrent track circuit current impulses are of positive polarity as illustrated by the second diagram of Fig. 14. These recurrent track circuit current impulses of positive polarity cause operation of tube G1 and relay CF1 but tube G2 is maintained non-conductive and the relay CF2 is inactive. Relay SR1 is now picked up but relay SR2 and relay SR3 are both released. Under this condition the Y lamp of the top group of lamps of signal CS is illuminated over back contact 99 of relay SR3 and front contact 101 of relay SR1, and the G lamp at the bottom group of lamps is illuminated over back contact 100 of relay SR3 and front contact 102 of relay SR1, so that the signal CS now displays an approach restricting signal.

If approach traffic conditions exist for the section W—X when the train enters that section so that the current impulses of the track circuit are of negative polarity as illustrated at the bottom diagram of Fig. 14, the electromotive forces induced in the winding 40 cause the tube G2 to be intermittently conductive for operating relay CF2 but tube G1 remains non-conductive and relay CF1 is inactive. This time relay SR2 is picked up and relays SR1 and SR3 are released. Under this condition of the relays the Y lamp of the top group of lamps is illuminated over back contacts 99 and 103 of relays SR3 and SR1, respectively, and front contact 105 of relay SR2, and the R lamp of the bottom group of lamps is illuminated over back contacts 100 and 104 of relays SR3 and SR1, with the result that an approach signal is displayed by the cab signal CS.

In the event the track section W—X is occupied by a first train then all track circuit current is shunted from the second train and both tubes G1 and G2 remain nonconductive and both relays CF1 and CF2 are inactive so that all three relays SR1, SR2 and SR3 are released. Under this condition the R lamp of the top group of lamps is illuminated over back contacts 99, 103 and 106, and the R lamp of the bottom group of lamps is illuminated over back contacts 100 and 104 so that the signal CS displays a slow speed cab signal.

Figure 6:
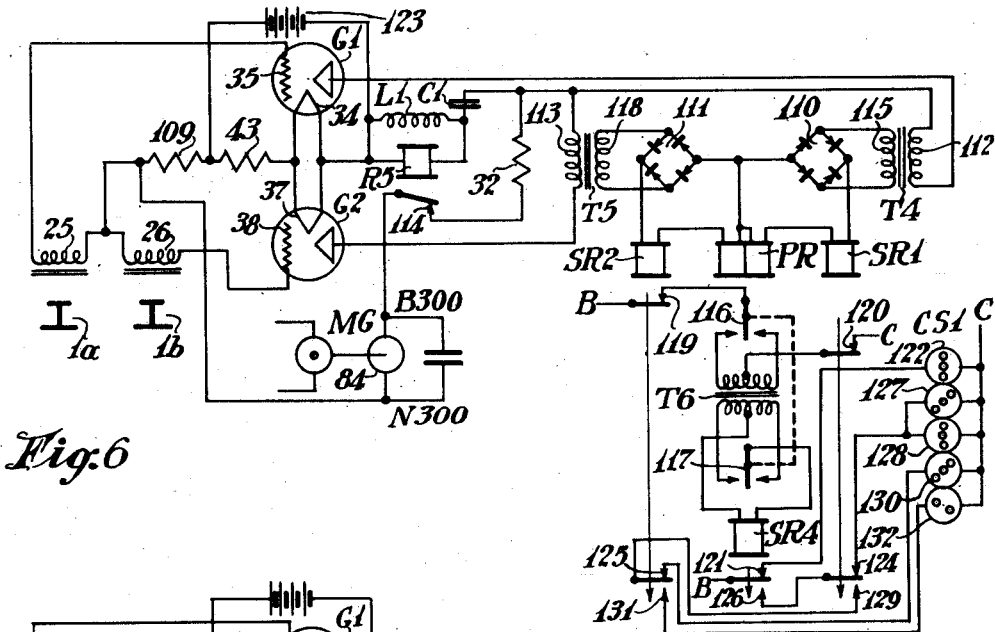

In the form of the train-carried apparatus disclosed in Fig. 6, the windings 25 and 26 are independent of one another, the winding 25 being connected with the grid circuit of tube G1 and the winding 26 being connected with the grid circuit of tube G2, as will be obvious from Fig. 6. The slow acting relay SR1 is controlled by tube G1 through a transformer T4 and a full wave rectifier 110, and the slow acting relay SR2 is controlled by tube G2 through a transformer T5 and a full wave rectifier 111. A polar relay PR is provided, its right-hand winding being serially interposed with the winding of relay SR1 across the output terminals of rectifier 110, and its left-hand winding being serially interposed with the winding of relay SR2 across the output terminals of rectifier 111. The polar relay PR controls a slow acting relay SR4 through a transformer T6 in a manner to later appear. The cab signal CS1 is of the position light type capable of displaying four different indications. The oscillatory circuit associated with tube G1 includes condenser C1, primary winding 112 of the transformer T4, anode-cathode space of tube G1, and the winding of a relay R5 and an inductor L1 in multiple. In a similar manner the oscillatory circuit for tube G2 includes condenser C1, primary winding 113 of transformer T5, anode-filament space of tube G2 and the winding of relay R5 and inductor L1 in multiple. It will be understood that the inductor L1 may be omitted and the winding of relay R5 proportioned to provide the desired inductance.

In Fig. 6 a battery 123 is provided for heating the filaments of the tubes G1 and G2 through resistor 43, resistor 43 being proportioned to provide a desired normal grid bias for the tubes. Also, a resistor 109 is interposed between the terminal N300 of generator 84 and the resistor 43 and is thus interposed in the anode circuits of the tubes. Normally the condenser C1 is charged at substantially the voltage of the generator 84 the same as in Fig. 5.

In describing the operation of the apparatus of Fig. 6, I shall assume that a train on which the apparatus of Fig. 6 is mounted enters track section W—X of Fig. 4 under clear traffic conditions, the relays SR1, SR2, PR and SR4 being taken at the start as all deenergized. The windings 25 and 26 are so connected that the electromotive forces induced therein in response to a track circuit current impulse of positive polarity causes the grid 35 of tube G1 to be first positive in potential with respect to its filament, and causes the grid 38 of tube G2 to be first negative in potential with respect to its filament 37. Track circuit current impulses of negative polarity will therefore first cause the grid 38 of tube G2 to be positive with respect to its filament 37 and the grid 35 of the tube G1 to be negative in potential with respect to its filament. As explained in connection with Fig. 2 the tube G1 is therefore ionized and becomes conductive in response to a track circuit current impulse of positive polarity. The condenser C1 discharges through the oscillatory circuit provided for tube G1. Current also flows from generator 84 through the anode circuit of tube G1. The circuit constants are so chosen that when the oscillatory discharge from condenser C1 falls to substantially zero, tube G1 deionizes and becomes non-conductive. The discharge of condenser C1 and the bias voltage produced by the anode current from generator 84 flowing in resistors 43 and 109 maintain the tube G2 non-conductive during the second half cycle of the induced electromotive force in response to a track circuit current impulse of positive polarity in the same manner as described for Figs. 2 and 5. Furthermore, in Fig. 6 the relay R5 is momentarily picked up by the discharge of condenser C1 and opens at its back contact 114 the connection of generator 84 with the anode circuits. The relay R5 will not ordinarily be needed; however, it provides additional means by which proper operation of the tubes G1 and G2 is assured. The impulse of current flowing in the primary winding 112 on transformer T4 when the tube G1 is conductive causes an electromotive force to be induced in the secondary winding 115 of transformer T4 which when rectified by rectifier 110 is effective to energize relay SR1 and the right-hand winding of the polar relay PR, the relay SR1 being picked up and the polar relay PR operating its polar contact members 116 and 117 to the right-hand position. The next current impulse of the track circuit is of negative polarity so that the tube G2 is ionized and becomes conductive while tube G1 is maintained non-conductive. Condenser C1 now discharges through the oscillatory circuit associated with tube G2 and the generator 84 functions to supply current to the anode circuit of tube G2, tube G2 deionizing and becoming non-conductive subsequent to the current impulse by virtue of the action of the condenser C1. This time the impulse of current produced in the primary winding 113 of transformer T5 induces an electromotive force in the secondary winding 118 of that transformer which when rectified by rectifier 111 is effective to energize relay SR2 and the left-hand winding of relay PR, relay SR2 being picked up and relay PR operating its polar contacts 116 and 117 to their left-hand positions. From this point on the relays SR1, SR2 and PR are alternately energized in response to the track circuit current impulses, the relays SR2 and SR1 being retained picked up due to their slow releasing characteristics, and the polar relay PR being operated to alternately close its right-hand and left-hand contacts. With front contacts 119 and 120 of relays SR2 and SR1 closed and the contact members 116 and 117 operated, recurrent impulses of current are supplied to the winding of relay SR4 through the medium of transformer T6, the current impulses flowing in the winding of relay SR4 in the same direction so that that relay is picked up and retained energized since it is slow releasing in character. With relay SR4 picked up closing front contact 121, the lamp 122 of signal CS1 is illuminated to display a clear signal.

If approach restricting traffic conditions exist for the section W—X and the recurrent impulses of current are all of positive polarity the tube G1 is periodically conductive and relay SR1 is picked up and relay PR is operated to close its right-hand contacts only. With relay SR2 released at the end of the slow release period opening its front contact 119 current is removed from the primary winding of transformer T6 and the third repeater relay SR4 is deenergized and released. With relay SR4 released closing its back contact 126 and relay SR1 picked up closing its front contact 124, a circuit is formed for the lamps 127 and 128 of signal CS1 to display an approach restricting signal.

Under approach traffic conditions in the section W—X, the recurrent track circuit current impulses are of negative polarity and tube G2 is periodically conductive so that relay SR2 is picked up while relay SR1 is released. Relay SR1 upon releasing to open front contact 120 removes current for energizing the relay SR4 and that relay is released. A circuit is now formed over back contact 126 of relay SR4, back contact 129 of relay SR1 and front contact 125 of relay SR2 for the lamp 130, and signal CS1 displays an approach signal. With the section W—X occupied and the track circuit current shunted away from the second train so that both tubes G1 and G2 remain non-conductive, the relays SR1, SR2 and SR4 are all deenergized. A circuit is now formed including back contacts 126, 129 and 131 for the lamp 132, and signal CS1 displays a slow speed signal.

Figure 7:
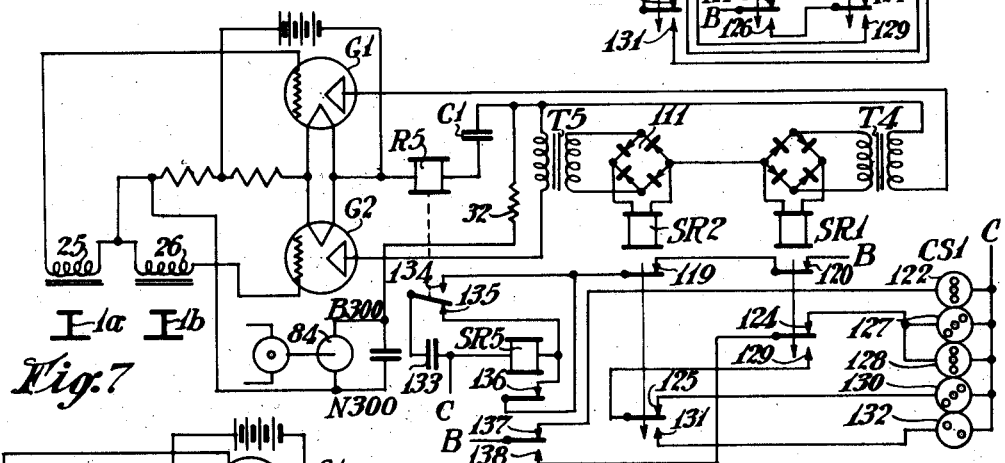

The train-carried apparatus of Fig. 7 is similar to that of Fig. 6 except the polar relay PR, transformer T6 and relay SR4 are replaced by a repeater relay SR5 which is controlled by the relay R5. The inductor L1 in multiple with the winding of relay R5 is omitted and the connection of the generator 84 with the anode circuits is not controlled over a back contact of the relay R5.

When a train on which the apparatus of Fig. 7 is mounted enters the track section W—X of Fig. 4 under clear traffic conditions, the recurrent track circuit current impulses alternately positive and negative in polarity cause the tubes G1 and G2 to be alternately conductive in the manner previously described, and relays SR1 and SR2 are picked up. With both relays SR1 and SR2 picked up to close the respective front contacts 120 and 119, a condenser 133 is charged during the next impulse so that relay R5 is picked up to close its front contact 134. At the end of such impulse relay R5 releases closing its back contact 135 and condenser 133 discharges through the winding of relay SR5 to pick up that relay. Relay SR5 is retained energized over its stick circuit including its own front contact 136 and the front contacts 119 and 120. With relay SR5 picked up closing its front contact 137 the lamp 122 of signal CS1 is illuminated to display a clear signal.

The arrangement of storing energy in a condenser over a contact of a relay picked up only during a current impulse interval and discharging such stored energy during the interval between successive current impulses to energize another relay is disclosed and claimed in my aforementioned copending application Serial No. 239,523.

Under approach restricting traffic conditions for the section W—X the tube G1 is made conductive in response to the recurrent track circuit current impulses so that relay SR1 only is picked up, and the lamps 127 and 128 of signal CS1 are illuminated over back contact 138 of relay SR5 and front contact 124 of relay SR1 to display an approach restricting signal. Under approach traffic conditions for the section W—X tube G2 only is made periodically conductive in response to the track circuit current impulses so that only relay SR2 is picked up. The lamp 130 of signal CS1 is now illuminated over back contacts 138 and 129 of relays SR5 and SR1, respectively, and front contact 125 of relay SR2 so that the signal CS1 displays an approach signal. In the event that the track section W—X is occupied, so that no energy is induced in the windings 25 and 26, then all three of the relays SR1, SR2 and SR5 are deenergized and the slow speed signal lamp 132 is illuminated over the circuit including back contacts 138, 129 and 131.

Figure 8:
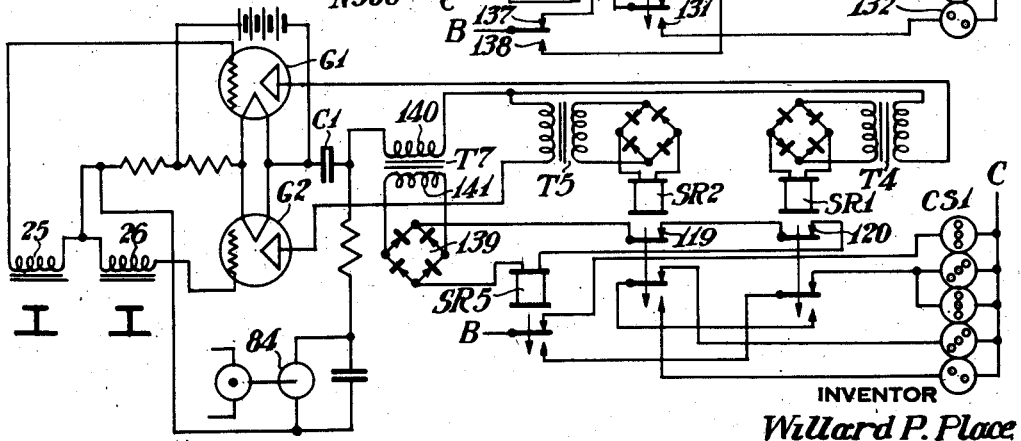

In Fig. 8, the train-carried apparatus is the same as in Fig. 7 except the repeater relay SR5 is made slow releasing and is governed through the medium of a transformer T7 and a full wave rectifier 139, the primary winding 140 of transformer T7 being interposed in the anode circuits for the tubes G1 and G2, as will be apparent from an inspection of Fig. 8.

When the train on which the apparatus of Fig. 8 is mounted occupies the section W—X of Fig. 4 under clear traffic conditions in advance and the recurrent track circuit current impulses alternately of positive and negative polarity cause the tubes G1 and G2 to be alternately conductive, the relays SR1 and SR2 are picked up in a manner previously described. With relays SR1 and SR2 picked up closing front contacts 120 and 119 the recurrent impulses of current flowing in the winding 140 of transformer T7 induce electromotive forces in the secondary winding 141 of that transformer which are rectified by rectifier 139 and supplied to the winding of relay SR5 so that relay SR5 is picked up. The relays SR5, SR1 and SR2 of Fig. 8 control the operating circuits for the signal CS1 in the same manner as described for Fig. 7. It is clear, therefore, that the apparatus of Fig. 8 will respond to the different traffic conditions produced for the track circuit for section W—X of Fig. 4 in substantially the same manner as the apparatus of Fig. 7 and the description need not be repeated in detail.

Figure 9:
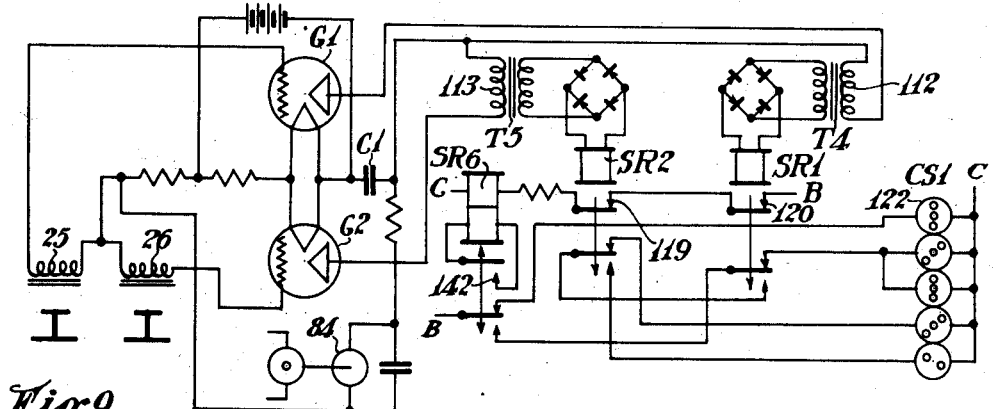

In the train-carried apparatus of Fig. 9, the transformer T7, rectifier 139 and relay SR5 of Fig. 8 are replaced by a relay SR6 which is provided with slow pick-up slow release characteristics. In the form of the invention disclosed in Fig. 9 the primary winding 112 of transformer T4 and the primary winding 113 of transformer T5 are each so proportioned as to provide the desired inductance in series with condenser C1 without any additional inductance. When the train on which the apparatus of Fig. 9 is mounted occupies the track section W—X of Fig. 4 under approach traffic conditions and the track circuit is supplied with current impulses of negative polarity the tube G2 and relay SR2 are responsive in the same manner as described in connection with Fig. 7. Under approach restricting traffic conditions and the track circuit is supplied with current impulses of positive polarity the tube G1 and relay SR1 are responsive thereto in substantially the same manner as described in Fig. 7. Again, under clear traffic conditions so that the track circuit is supplied with recurrent impulses of current alternately positive and negative in polarity both tubes G1 and G2 are responsive and both relays SR1 and SR2 are energized. The top winding of relay SR6 is energized over front contacts 119 and 120 of relays SR2 and SR1 and the relay SR6 is picked up at the end of its slow pick-up period in response to clear traffic conditions of the track circuit. It is to be noted that the relay SR6 is made slow to pick up in part by being provided with a lower winding which is short-circuited over its own back contact 142. The operating circuits for the signal CS1 are governed by the relays SR6, SR1 and SR2 of Fig. 9 in a manner similar to the control effected by relays SR5, SR1 and SR2 of Fig. 7, and a further description thereof is thought to be unnecessary. It should be noted that the relay SR6 is provided with a slow to pick up period sufficient that relay SR6 is not picked up during the brief interval both relays SR1 and SR2 may be energized during a change from approach restricting to approach or vice versa, and a false flash of a signal indication by the signal CS1 is avoided.

In Figs. 6, 7, 8 and 9 the inductor windings 25 and 26 are independent of each other as pointed out hereinbefore. When the inductors are thus arranged only one electron tube G1 or G2 could be energized in case track circuit current flows in one rail only as it may sometimes do because of a broken track rail. With only one tube G1 or G2 energized only one of the restrictive indications, approach restricting or approach, can be effected but a false clear signal cannot be effected.

Referring to Fig. 10, the track rails 1a and 1b are formed into consecutive insulated track sections each of which is provided with a track circuit the same as in Fig. 1. In Fig. 10 a train TC indicated diagrammatically by dotted lines is shown as occupying the section W—X.

The source of code impulses for the track circuit for the section W—X of Fig. 10 comprises battery 2, track transformer T1 and a code transmitter CT2. The code transmitter CT2 is of the frequency code type, several of such types being well known to the art. The operating winding of the code transmitter CT2 is connected with the current source and is continuously active to operate three code contact members 75b, 120b and 180b, the arrangement being such that the code contact member 75b is operated to close contact 75a—75b at the rate of say 75 times per minute, code contact member 120b is operated to close contact 120a—120b at the rate of 120 times per minute, and the code contact member 180b is operated to close contact 180a—180b at the rate of 180 times per minute.

At such time as a relay WA of the code responsive relay means for the track circuit of the section next in advance of section W—X is picked up closing its front contact 143, or when relay WA is released closing its back contact 144 and a second relay WR of the code responsive relay means is picked up closing its front contact 145, the battery 2 is connected across the winding 4 of transformer T1 over the contact 180a—180b of the code transmitter CT2 and direct current impulses of the code frequency of 180 are supplied to the track circuit for section W—X, the polarity of the code impulses being all the same, for example, they may be all of positive polarity. When both relays WA and WR are released closing back contacts 144 and 146, respectively, and a third relay WL of the code responsive relay means is picked up closing its front contact 147, the battery 2 is connected across winding 4 over contact 120a—120b of the code transmitter CT2 and direct current impulses of the code frequency of 120 are supplied to the track circuit of section W—X, the impulses being all of positive polarity. Again, when relays WA, WR and WL are all released closing back contacts 144, 146 and 148, battery 2 is connected across winding 4 over the code contact 75a—75b and the track circuit for the section W—X is supplied with impulses of current at the code frequency of 75, the impulses again being all of positive polarity.

Assuming for the time being that the train TC does not occupy the section W—X, a code following relay XTR1 connected across the rails of the section W—X operates its contact member 149 at the code frequency of the impulses supplied to the track circuit. Operation of the code contact member 149 causes direct current to be alternately supplied to the two portions of the primary winding 150 of a transformer T8 with the result that electromotive forces of corresponding code frequency are induced in the secondary winding 151 of that transformer and are applied to the input terminals of a frequency decoding unit XFD. The structure of the frequency decoding unit XFD is immaterial, several of such decoding units being well known. It is deemed sufficient for this application to say that the decoding unit XFD causes a relay XA connected with its output side to be energized only in response to code impulses of the 180 code frequency, causes a relay XR connected with its output side to be energized only in response to code impulses of the 120 code, and causes a relay XL connected with its output side to be energized in response to either the 180, 120 or 75 code frequency.

In like fashion a code following relay WTR1 for the track circuit of the section next in advance of section W—X governs through a transformer T9 a frequency decoding unit WFD for selectively energizing the relays WA, WR and WL in accordance with the code frequency of the impulses of the track circuit current of that section.

It should be pointed out that the code frequency of 180 for the track circuit impulses represents clear traffic conditions, the code frequency of 120 for the track circuit impulses represents approach restricting traffic conditions, the code impulse frequency of 75 for the track circuit impulses represents approach traffic conditions, and an absence of any of these code impulses represents stop or slow speed traffic conditions.

The relays WA, WR and WL govern the operating circuits for wayside signal WS as will be apparent from Fig. 10. Such operative circuits are shown conventionally only for the sake of simplicity, since they would be in accordance with standard practice and form no part of my present invention.

The relays XA, XR and XL for the track circuit of section W—X govern the track circuit for the section next in the rear and the operating circuits for the wayside signal XS in the same manner as the relays WA, WR and WL control the track circuit of section W—X and the operating circuits for signal WS.

It should also be pointed out that the code impulses of direct current applied to the track circuits of Fig. 10 are of relatively short duration and relatively high peak voltage the same as in Figs. 1 and 4 except for the fact that they are all of the same polarity and have different code frequencies whereas in Figs. 1 and 4 the impulses are of the same frequency but different in polarity.

The train TC of Fig. 10 is provided with train-carried apparatus which is selectively responsive to the different code frequencies of the direct current track circuit impulses. The train TC is provided with inductor windings 25 and 26 the same as in Fig. 2. Windings 25 and 26 are connected across the primary winding 152 of an input transformer T10, filter circuits being preferably interposed in the connection. As here shown, the filter circuits are made up of a condenser 153 connected in series with an inductor 154 and tuned to by-pass 25 cycle alternating current; and a condenser 155 connected in series with an inductor 156 and tuned to by-pass 60 cycle alternating current. By using such filter circuits interference by 25 cycle and 60 cycle alternating current flowing in the track rails is avoided.

The secondary winding 157 of transformer T10 is connected across the grid 158 and filament 159 of an amplifying tube 160 of the indirect heater type. The plate circuit of tube 160 is coupled with the grid circuit of a controlled ionization tube G3 by a well-known form of coupling circuit made up of resistors 161 and 162 and a condenser 163. The generator 84 of the motor generator MG is used to supply plate voltage for the tube 160. In this instance the tube G3 is of the indirect heater type, the two principal electrodes being anode 164 and cathode 165 while its control element is a grid 166.

The anode circuit for tube G3 includes terminal B300 of generator 84, resistor 32, top winding of a code following master relay MR1, anode 164, tube space to cathode 165 and terminal N300 of the generator. Condenser C1 and inductor L1 are connected with the anode circuit to provide the tube G3 with an oscillatory circuit, this circuit involving condenser C1, top winding of relay MR1, the anode-cathode space of tube G3 and inductor L1. Normally the condenser C1 is charged at substantially the voltage of the generator 84 the same as in other forms of the invention.

The code following master relay MR1 controls a frequency decoding unit TFD of the standard type, the input side of unit TFD being connected with the secondary winding 167 of a transformer T11 the two portions of the primary winding 168 of which transformer are supplied with direct current over the code contact member 169 of relay MR1. In accordance with usual practice a relay TA connected with the output side of the decoding unit TFD is energized only when the relay MR1 is operated at the code frequency of 180 cycles per minute, relay TR is energized only when relay MR1 is operated at the code frequency of 120 cycles per minute, and relay TL is energized when the relay MR1 is operated at either 180, 120 or 75 code frequency. The relays TA, TR and TL govern the operating circuits for the cab signal CS1 as is obvious from Fig. 10.

Assuming that clear traffic conditions exist in the section W—X of Fig. 10 so that track circuit impulses of the code frequency of 180 are flowing in the track rails, each impulse induces an electromotive force in the train-carried windings 25 and 26 which is amplified by tube 160 and is applied to the control grid 166 of tube G1. The wave form of such induced electromotive force is similar to that illustrated in curves 1, 3, and 5 of Fig. 15, since each track circuit impulse is of direct current of relatively short duration and high peak voltage. The parts are so connected that during the first half cycle of the induced electromotive force the grid 166 of tube G3 is rendered positive in potential with respect to the cathode 165 and tube G3 is ionized and becomes conductive. Current flows from condenser C1 through the top winding of relay MR1, anode-cathode space of tube G3, inductor L1 and back to condenser C1. Current also flows from generator 84 through the associated anode circuit including resistor 32 and the top winding of relay MR1 as well as the anode-cathode space of tube G3. When, because of the oscillatory nature of the discharge from condenser C1, the current through tube G3 falls to a relatively low value the tube G3 deionizes and becomes non-conductive. The condenser C1 is quickly recharged so that the above described operation is repeated for each code impulse of the track circuit current. The parts are so proportioned that tube G3 deionizes and condenser C1 is recharged in a period slightly less than .3 second which is the interval between successive impulses of the 180 code frequency.

The impulses of current passed by tube G3 flowing in the top winding of relay MR1 causes that relay to be operated at the same code frequency with the result that the relays TA and TL are energized.

Under approach restricting traffic conditions and the track circuit current impulses are of the 120 code frequency, the operation of the train carried apparatus of Fig. 10 is similar to that described above except for the fact that relay MR1 is operated at the code frequency of 120 and relays TR and TL are energized. Again, under approach traffic conditions so that the track circuit is supplied with impulses of the 75 code frequency, the operation of the train-carried apparatus is the same except relay MR1 is operated at the code frequency of 75 and relay TL is energized. Under slow speed traffic conditions at which time the track circuit is shunted by a train in advance then relay MR1 does not operate and all three relays TA, TR and TL are deenergized. It is clear therefore that the cab signal CS1 of Fig. 10 is caused to display a signal corresponding to the code frequency of the track circuit current.

Since the impulses passed by the tube G3 of Fig. 10 are relatively short and since it is desirable that the code impulses supplied to the decoding unit TFD have nearly equal "on" and "off" periods, the relay MR1 is provided with a lower winding which is connected with a reactor L3 over front contact 270 and transfer contact 171 of a continuity transfer type of contact. When relay MR1 is released ("off" position) reactor L3 is supplied with current from the source B32—N32 over contacts 170—171 and reactor L3 stores up magnetic energy, the amount of energy depending within limits upon the length of time reactor L3 is supplied with current. When relay MR1 is picked up ("on" position) the reactor L3 is connected with the lower winding of relay MR1 and disconnected from the current source. This causes current to flow in the lower winding of relay MR1 due to the decay of the magnetic energy stored in reactor L3 and relay MR1 is maintained energized for an interval subsequent to the termination of the impulse of current flowing in the top winding of that relay due to the action of the tube G3. Thus the code impulses applied to decoding unit TFD due to the operation of relay MR1 have substantially equal "off" and "on" periods notwithstanding the fact that relay MR1 may be operated at 180, or 120 or 75 code frequency, the "off" and "on" periods of relay MR1 being of an interval corresponding to the code frequency.

Referring to Fig. 11, the train-carried apparatus comprises two receiving channels one effectively influenced by recurrent impulses of direct current and the other effectively influenced by coded alternating current. If the train on which the apparatus of Fig. 11 is mounted is operating over territory on which the track circuits use direct current code impulses such as provided by the trackway apparatus of Fig. 10, a receiving channel comprising a controlled ionization type of electron tube is responsive thereto. When the train is operating over territory where track circuits are provided which use coded alternating current of 100 cycles per second such as are so widely used in present day code signalling systems, a receiving channel including a high vacuum amplifying electron tube is responsive thereto.

In Fig. 11, the receiving channel responsive to direct current impulses includes an input transformer T12, a controlled ionization tube G3 and a master relay MR1. The receiving channel responsive to coded alternating current includes an input transformer T13, a pentode tube 25L6 and a master relay MR. The inductor windings 25 and 26 of Fig. 11 are connected with the primary windings 172 and 173 of the transformers T12 and T13, respectively, in multiple. Hence energy received from the track circuit is applied to the two receiving channels of Fig. 11 in parallel.

Referring to the receiving channel including tube G3, the grid circuit of the tube is connected with the secondary winding 175 of the input transformer T12 as will be apparent by an inspection of the drawing. The anode circuit of tube G3 and the associated oscillatory circuit including condenser C1 and inductance L1 are the same as in Fig. 10. Also, the top winding of the master relay MR1 is interposed in the anode and oscillatory circuits the same as in Fig. 10. It should be noted that the lower winding of relay MR1 of Fig. 11 is connected with the reactor L3 over a transfer contact of the usual type rather than over a continuity transfer contact as in Fig. 10. The reactor L3 of Fig. 11 is connected with the B32—N32 source of current over back contact 195 when relay MR1 is deenergized and is transferred to the lower winding of the relay over front contact 196 when the relay is energized. A resistor 180 is connected across reactor L3 to prevent a loss of the energy stored in the reactor during a transfer of the associated contact. Relay MR1 when operated causes through its contact member 169 direct current to be alternately supplied to the two portions of winding 168 of transformer T11 with the result that impulses of current of a frequency corresponding to the frequency at which the relay MR1 is operated are supplied to the input terminals of the frequency decoding unit TFD. A resistor 197 is preferably connected across the supply circuit ahead of the contact member 169 to allow a substantially uniform flow of direct current through the winding 168 when relay MR1 is not operated. The purpose of resistor 197 will appear hereinafter.

Relays TA, TR and TL of Fig. 11 are connected with the output side of the decoding unit TFD and are selectively governed thereby in the same manner as in Fig. 10. Also, the relays TA, TR and TL govern the circuits for the cab signal CS1 in the manner previously described. Hence, direct current impulses of 180, 120 and 75 code frequencies when applied to the receiving channel including tube G3 are effective to cause the signal CS1 to display a corresponding signal indication.

Referring to the receiving channel including tube 25L6, a condenser 174 is interposed in the connection of primary winding 173 of transformer T13 with the windings 25 and 26, and a condenser 184 is connected across the secondary winding 176 of transformer T13 which secondary winding is included in the grid circuit of tube 25L6 as is apparent from Fig. 11. The parts are so proportioned that the input circuit for tube 25L6 is effectively responsive only to alternating current of 100 cycles per second. The tube 25L6 is of the low voltage type and its plate circuit is supplied from the B32—N32 source of current, plate 177 of tube 25L6 being connected with terminal B32 through primary winding 178 of a transformer T14, and cathode 179 of the tube being connected with terminal N32 through a biasing resistor 198. The secondary winding 181 of transformer T14 is connected with the winding of relay MR. Relay MR is of the usual code following type and is provided with two contact members 182 and 183 which remain in the position to which they were last moved when the relay is deenergized. Relay MR controls the supply of direct current to the winding 168 of transformer T11 in a manner to shortly appear, and hence causes impulses of current to be supplied to the input side of the decoding unit TFD which are of a frequency corresponding to the frequency at which relay MR is operated. Hence alternating current of the 180, 120 and 75 code frequencies when applied to the receiving channel including tube 25L6 are amplified and decoded to control relays TA, TR and TL and in turn to cause signal CS1 to display corresponding signal indications.

Assuming the train on which the apparatus of Fig. 11 is mounted is moving over the track section W—X of Fig. 10 under clear traffic conditions so that direct current impulses of 180 code frequency are supplied to the track circuit, corresponding electromotive forces are induced in the windings 25 and 26 and are applied to the two receiving channels in parallel, the train TC of Fig. 10 being, of course, considered as not present.

Since the wave form of the electromotive force induced in windings 25 and 26 in response to the direct current impulses contain little if any alternating current energy of 100 cycles, the tube 25L6 is not affected thereby. The first half cycle of the electromotive force induced in the secondary winding 175 of transformer T12 of each of the direct current impulses causes the grid 166 of tube G3 to be positive in potential with respect to the cathode 165, and tube G3 ionizes and becomes conductive. Tube G3 is deionized and restored to its non-conductive condition subsequent to each such current impulse by virtue of the condenser C1 and its associated oscillatory circuit in the same manner as described in previous cases, relay MR1 being operated in response to each impulse of current flowing in the anode circuit of tube G3. Since relay MR is deenergized the operation of contact member 169 of relay MR1 causes direct current to be alternately supplied to the two portions of primary winding 168 of transformer T11. This signalling or supply circuit for transformer T11 can be traced from terminal B over contact member 183 in its right-hand position, primary winding 185 of a transformer T15 to be later referred to, left-hand portion of winding 168 and back contact of contact member 169 or right-hand portion of winding 168 and the front contact of contact member 169, and contact member 182 in its right-hand position to terminal C. It follows that current impulses corresponding in frequency to the 180 code frequency are supplied to the decoding unit TFD and relay TA in turn is energized to cause signal CS1 to display a clear indication. Operation of the apparatus in response to direct current impulses supplied to the track circuit of section W—X of the 120 or 75 code frequency in accordance with different traffic conditions causes relay TR to be picked up at the 120 code frequency and signal CS1 to display approach restricting indication, and causes only relay TL to be picked up at the 75 code frequency and the signal CS1 to display an approach indication.

It should be noted that the transformer T15 is so designed that when the relay MR1 is operated, the electromotive forces induced in the secondary winding 186 when rectified by a full wave rectifier 187 are not effective to energize a relay R6 whose winding is connected across the output terminals of rectifier 187 sufficiently to pick up that relay. Furthermore, the resistor 197 which allows a substantially uniform amount of direct current to flow when relay MR1 is operated aids in assuring that not sufficient energy is supplied to relay R6 to pick up the relay.

Assuming the train on which the apparatus of Fig. 11 is mounted is operating over a track circuit to which coded alternating current is supplied at the code frequency of 180, 120 or 75 according to different traffic conditions, each such code group of alternating current induces an electromotive force in the windings 25 and 26 which is applied to the two receiving channels in parallel. Trackway apparatus operative to supply such coded alternating current is well known and may be that disclosed in the United States Letters Patent No. 1,773,515, granted August 19, 1930, to C. C. Buchanan, for Railway traffic controlling apparatus.

The electromotive force now induced in windings 25 and 26 will be applied to the grid circuit of tube 25L6 where it is amplified and applied through transformer T14 to the master relay MR to operate relay MR in the well known manner. With relay MR operated and relay MR1 inactive direct current from the source B—C is reversibly supplied to the left-hand portion of winding 168 of transformer T11 with the result that electromotive forces are induced in the secondary winding 167 of transformer T11, and impulses of current of a frequency corresponding to the code frequency at which relay MR is operative are supplied to the decoding unit TFD. Relays TA, TR and TL are selectively controlled according to the frequency of the code impulses supplied to the unit TFD in the manner previously pointed out with the result that signal CS1 displays an indication corresponding to the code frequency of the alternating current impulses of the track circuit.

When relay MR is operated the direct current flowing in winding 185 of transformer T15 is periodically reversed and the electromotive force induced in the secondary winding 186 of that transformer when rectified by rectifier 187 is effective to energize relay R6 sufficiently to pick up that relay, relay R6 being retained picked up from one impulse of the track circuit current to the next due to its slow release characteristic. Relay R6 in picking up to open its back contact 188 removes current from motor 85 of the motor generator MG and generator 84 no longer supplies current to the anode circuit of tube G3, with the result that the receiving channel including tube G3 becomes inactive. That is, relay R6 is operated by the receving channel responsive to coded alternating current, and automatically renders the receiving channel responsive to direct current impulses inactive. Again it is to be noted that the tuning of the input circuit for the tube 25L6 as affected by the condensers 174 and 184 automatically desensitizes the receiving channel normally responsive to alternating current so that channel in unaffected by the direct current track circuit impulses.

In Fig. 12, the train-carried apparatus comprises two receiving channels the same as in Fig. 11. In Fig. 12 the controlled ionization tube G3 of the receiving channel responsive to recurrent impulses of direct current is preceded by a stage of amplification including a high vacuum electron tube 6Q7 of the indirect heater type and having two diode plates 189 and 190. The grid circuit of tube G3 is coupled with the plate circuit of the preceding amplifier tube 6Q7 by a circuit comprising resistors 161 and 162 and a condenser 163 similar to the coupling circuit of Fig. 10 except in Fig. 12 a resistor 191 is interposed in the grid circuit of the tube G3 between resistor 162 and the terminal N32. The grid circuit for tube 6Q7 is connected directly with the inductor windings 25 and 26, a resistor 192 being interposed in the circuit adjacent the terminal N32 as is apparent from Fig. 12. The resistors 191 and 192 provide a desirable normal grid bias for tubes G3 and 6Q7, respectively.

The receiving channel responsive to coded alternating current includes transformer T13, tube 25L6 and master relay MR the same as in Fig. 11.

The master relays MR and MR1 control the impulses supplied to the frequency decoding unit TFD by controlling the supply of direct current to the primary winding 168 of transformer T11 in the same manner as in Fig. 11 except in Fig. 12 the transformer T15, rectifier 187, relay R6 and resistor 197 are omitted.

In Fig. 12 the means for desensitizing the receiving channel including tube 25L6 so that it is not responsive to direct current impulses includes condensers 174 and 184 the same as in Fig. 11. In Fig. 12, the means for automatically desensitizing the receiving channel including tube G3 when coded alternating current is picked up from the track circuit includes two condensers 193 and 194. Condenser 193 is connected between a point P in the supply circuit for transformer T11 and the resistor 191 of the grid circuit of tube G3, and condenser 194 is connected between a point Q in the supply circuit for transformer T11 and the resistor 192 of the grid circuit of tube 6Q7. Also one side of the condenser 193 is connected with the diode plate 190 of tube 6Q7 over wire 199, and one side of a condenser 194 is connected with diode plate 189 over a wire 200. Point P is located in the supply circuit between the contact member 182 of relay MR and contact member 169 of relay MR1, and point Q is located in the supply circuit between the contact member 183 of relay MR and the central terminal of winding 168 of transformer T11.

When the train on which the apparatus of Fig. 12 is mounted operates over track circuits supplied with code impulses of direct current of different code frequencies as provided by the trackway apparatus on Fig. 10, the receiving channel including tube G3 and relay MR1 is responsive and operates in the same manner as described in detail in Fig. 11 except that the electromotive forces induced in windings 25 and 26 are first amplified at tube 6Q7.

When the train is operated over track circuits to which coded alternating current of different code frequencies is supplied, the receiving channel including tube 25L6 and master relay MR is responsive to control the cab signal CS1 the same as in Fig. 11.

When master relay MR is not operating, the voltage appearing between points P and Q is essentially a direct current voltage whether master relay MR1 is operating or not. When relay MR is operating in response to code impulses of alternating current the current supplied to winding 168 is periodically reversed and surges of alternating current voltage appear between points P and Q whenever relay MR operates to interrupt the circuit. The alternating current voltages appearing between points P and Q are supplied through condensers 193 and 194 to the diode plates 189 and 190 of tube 6Q7 where such voltages are rectified and applied as unidirectional voltages across resistors 191 and 192. Such rectified unidirectional voltage creates voltages which are added to the normal bias voltage of tubes 6Q7 and G3. The parts are so proportioned that the grid bias voltage applied to tubes 6Q7 and G3 are correct only when no rectified current is applied to resistors 191 and 192. The voltage created by the rectified current flowing in these resistors when added to the normal bias voltage causes tubes 6Q7 and G3 to be so highly negative that they no longer function. Consequently, when the train is operating over territory in which track circuits are supplied with coded alternating current the receiving channel normally responsive to direct current impulses is desensitized, and when the train is operating over territory using track circuits in which direct current impulses are supplied the receiving channel normally responsive to alternating current is unaffected due to the tuning of the input circuit of that receiving channel.

In Fig. 13 the train-carried apparatus is the same as in Fig. 12 except for the means used to desensitize the tubes 6Q7 and G3. In Fig. 13 the diode plates 189 and 190 of tube 6Q7 are connected in a full wave rectified circuit made up of condensers 193 and 194 and an additional condenser 201, together with resistors 202, 203 and 204. Alternating current surges appearing at points P and Q when master relay MR is operating are rectified by the diode plates 189 and 190 and are effective to charge the condenser 201. The voltage across condenser 201 when thus charged adds to the normal bias voltage of tubes 6Q7 and G3, and these tubes are provided with a bias of such negative potential that they can no longer operate.

It is clear, therefore, that when a train on which the apparatus of Fig. 13 is mounted operates over territory using track circuits supplied with coded alternating current the receiving channel including tube 25L6 and relay MR is responsive to control the cab signal CS1. And when the train operates over territory using track circuits supplied with coded direct current impulses the receiving channel including tube G3 and relay MR1 is responsive to control the cab signal CS1, the operation being substantially the same as described in connection with the apparatus of Figs. 11 and 12.

It is to be understood, of course, that the train-carried apparatus of any of the several forms of apparatus embodying my invention can include circuits for controlling the air brake and power equipment according to any of the well-known arrangements, if desired.

Although I have herein shown and described only certain forms of apparatus embodying my invention, it is understood that various changes and modifications may be made therein without departing from the spirit and scope of my invention.

Having thus described my invention, what I claim is:

1. A signal system comprising, transmitting means for at times transmitting recurrent impulses of direct current of either positive polarity or of negative polarity according to two different signalling conditions, a receiving circuit for receiving such signalling impulses of current of different polarities; two electron tubes of the controlled ionization type each having an anode, a cathode and a control element; means for connecting said control elements to said receiving circuit so that a selected one of the tubes ionizes only for current impulses of positive polarity and the other tube ionizes only for current impulses of negative polarity, means to connect a source of direct current with the anodes and cathodes of said tubes to form two anode circuits one for each tube, means including a condenser connected to said cathodes and anodes to form two oscillatory circuits one for each tube, said condenser normally charged by said source and discharging when either tube ionizes through the oscillatory circuit of the ionized tube to deionize that tube and to substantially remove the anode potential from the other tube, and signalling means selectively controlled by the impulses of current thus caused to flow in said anode circuits.

2. A signal system comprising, transmitting means operative to selectively supply recurrent impulses of direct current of positive polarity or of negative polarity or alternately of positive and negative polarity, a receiving circuit for receiving such signalling impulses of current of different polarities; two electron tubes of the controlled ionization type each having an anode, a cathode and a control element; means for connecting said control elements to said receiving circuit so that a selected one of the tubes ionizes only for current impulses of positive polarity and the other tube ionizes only for current impulses of negative polarity, a source of direct current, a first and a second relay, means to connect the positive terminal of said source with the anode of one tube through a winding of said first relay and with the anode of the other tube through a winding of said second relay, other means to connect the negative terminal of said source with the cathode of each tube, means to connect a condenser and an inductance between the cathodes of the two tubes and the common terminal of said relay windings, said condenser normally charged from said source and discharging when either tube ionizes through the winding of the relay associated with the ionized tube and said inductance to effectively energize that relay a:. to deionize that tube, and to reduce the anode potential of the non-ionized tube to avoid ionization of said last mentioned tube, and signalling means controlled by said relays to display three different signals according as said first relay or said second relay or both of said relays are energized.

3. A signal system comprising, transmitting means operative to selectively supply recurrent impulses of direct current of positive polarity or of negative polarity or alternately of positive and negative polarity, a receiving circuit for receiving such signalling impulses of current of different polarities; two electron tubes of the controlled ionization type each having an anode, a cathode and a control element; means for connecting said control elements to said receiving circuit in a push pull arrangement so that a selected one of the tubes ionizes only for current impulses of positive polarity and the other tube ionizes only for current impulses of negative polarity, a first, a second, and a third transformer, a source of direct current having its negative terminal connected with the cathodes of said tubes in parallel and its positive terminal connected with the anode of one tube through the primary windings of said third and said first transformer in series and to the anode of the other tube through the primary windings of said third transformer and said second transformer in series, a first, a second, and a third relay; said first relay connected across the secondary winding of said first transformer through a first rectifier, said second relay connected across the secondary winding of said second transformer through a second rectifier, said third relay connected across the secondary winding of said third transformer through a third rectifier and a front contact of each of said first and second relays, means including a condenser connected to said cathodes and to the terminal of the primary winding of said third transformer adjacent said source, said condenser normally charged from said source and discharging when either tube ionizes to deionize that tube and to energize the corresponding relays, and signalling means controlled by said relays to display three different signals according as said first or said second or said third relay is energized.

4. A signal system comprising, transmitting means operative to selectively supply recurrent impulses of direct current of positive polarity or of negative polarity or alternately of positive and negative polarity, a receiving circuit for receiving such signalling impulses of current of different polarities; two electron tubes of the controlled ionization type each having an anode, a cathode and a control element; means for connecting said control elements to said receiving circuit in a push pull arrangement so that a selected one of the tubes ionizes only for current impulses of positive polarity and the other tube ionizes only for current impulses of negative polarity, a first and a second transformer, a source of direct current having its negative terminal connected with the cathodes of said tubes in parallel and its positive terminal connected with the anode of one tube through the primary winding of said first transformer and with the anode of the other tube through the primary winding of said second transformer, a first and a second relay, said first relay connected across the secondary winding of said first transformer through a first rectifier, and said second relay connected across the secondary winding of said second transformer through a second rectifier, a slow release slow pick-up relay controlled over a front contact of each of said first and second relays, and signal means controlled by said relays to display three different signals according as said first relay or said second relay or said slow release slow pick-up relay is energized.

5. A signal system, comprising, a sending circuit, two electron tubes of the controlled ionization type each having two electrodes and a control element, a source of direct current, means to connect said source with the electrodes of said tubes to form an anode circuit for each tube, said source ineffective to render either tube conductive, a receiving winding connected with said control elements in a push-pull arrangement and disposed in inductive relation with said sending circuit, transmitting means for supplying to said sending circuit recurrent impulses of direct current to induce in said receiving winding in response to each impulse of current an electromotive force having a single sinusoidal cycle, said transmitting means operative under one signalling condition to supply current impulses of positive polarity to initiate ionization of a selected one of said tubes by the first half cycle of the electromotive force produced by each impulse, said transmitting means operative under a second signalling condition to supply current impulses of negative polarity to initiate ionization of the other tube by the first half cycle of the electromotive force produced by each cycle, means including a condenser connected with said anode circuit for normally charging said condenser from said source of direct current and which condenser discharges when either tube becomes conductive to deionize the conductive tube, means controlled by each anode circuit when its associated tube is made conductive to bias the control element of the other tube to prevent ionization of said other tube in response to the second half cycle of the electromotive force the first half cycle of which causes said associated tube to be conductive, and signalling means selectively controlled by the current impulses thus caused to flow in said anode circuits.

6. A signal system for railways comprising, a stretch of track formed into consecutive track sections, trackway apparatus for a section to supply to the rails of that section recurrent impulses of direct current of positive polarity or of negative polarity according to two different traffic conditions in advance of the section, two train-carried windings one disposed in inductive relation with one rail and the other disposed in inductive relation with the other rail; two electron tubes of the controled ionization type each having an anode, a cathode and a control element; means to connect one of said windings with the control element and cathode of one tube and to connect the other of said windings with the control element and cathode of the other tube, said windings so connected that the control element of said one tube is made positive in potential with respect to its cathode and the control element of said other tube is made negative in potential with respect to its cathode when impulses of current of positive polarity flow in opposite directions in the rails and the condition is reversed when impulses of current of negative polarity flow in opposite directions in the rails, an anode circuit for each of said tubes, said tubes normally non-conductive and rendered conductive when its control element is made positive in potential by said electromotive forces, reactance means associated with each tube operative to deionize its tube subsequent to each of such electromotive forces, and signalling means selectively governed by said anode circuits.

7. A signal system for railways comprising, a stretch of railway track formed into consecutive track sections each having a track circuit, trackway apparatus for a section to supply to its track circuit recurrent impulses of direct current of positive polarity or of negative polarity according to different traffic conditions in advance of that section, a train, a receiving circuit mounted on said train for receiving an electromotive force in response to each of said current impulses, two train carried electron tubes of the controlled ionization type each having two principal electrodes and a control element, input circuits for said tubes connected with the control elements and a particular one of the electrodes of said tubes in a push pull arrangement, a source of direct current on the train, two electromagnetic devices each having an energizing winding, means to connect the negative terminal of said source to said particular one electrode of each of said tubes and to connect the positive terminal of said source to a common terminal of said windings, means to connect the other terminal of the winding of one of said devices to the other electrode of one of said tubes and to connect the other terminal of the winding of the other device to the other electrode of the other tube, means to couple said receiving circuit with said input circuits to cause a particular one of the tubes to ionize in response to each track circuit current impulse of positive polarity and the other tube to ionize in response to each track circuit current of negative polarity, a condenser, means to connect said condenser between said particular one electrode of each of said tubes and said common terminal of said windings so that said condenser is normally charged and discharges when either tube is ionized to effectively energize the associated device and to deionize such ionized tube, and a train carried signal selectively controlled by the successive energization thus created for one or the other of said devices.

8. A signal system comprising, transmitting means operative at times to transmit recurrent impulses of direct current of one or the other of two different signal codes; two electron tubes of the controlled ionization type each having an anode, a cathode and a control element; a receiving winding having one outside terminal connected with the control element of one tube, its other outside terminal connected with the control element of the other tube and its mid terminal connected to the cathode of both tubes through a resistor; two electromagnetic devices each having an energizing winding which have a common terminal, a source of direct current, means to connect the negative terminal of said source to said cathodes through said resistor and to connect the positive terminal of said source to said common terminal, other means to connect the other terminal of the winding of one of said devices to the anode of one of the tubes and to connect the other terminal of the winding of the other device to the anode of the other tube, a condenser, means to connect said condenser between the cathodes and said common terminal to form an oscillatory circuit for each tube, said source ineffective to render said tubes conductive but effective to charge said condenser, means to couple said transmitting means to said receiving winding to induce in said receiving winding in response to each current impulse of one of said signal codes an electromotive force which causes said one tube to ionize and to induce in said receiving winding in response to each current impulse of the other one of said signal codes an electromotive force which causes said other tube to ionize, said condenser when either tube becomes conductive discharging through the associated oscillatory circuit to deionize that tube, said source of direct current when either tube is conductive supplying current which produces a voltage drop across said resistor that biases the non-conductive tube to avoid its ionizing, and signalling means selectively controlled by the impulses of current thus caused to flow in the winding of one or the other of said devices.

9. A signal system for railways comprising, a railway track formed into consecutive track sections, trackway apparatus for a section for supplying to the rails of that section recurrent impulses of direct current of positive polarity or of negative polarity or alternately of positive and negative polarity according to three different traffic conditions in advance of that section, a train, a train carried receiving circuit disposed in inductive relation with the rails for receiving in response to each of said current impulses an electromotive force of a single sinusoidal cycle; two train carried electron tubes of the controlled ionization type each having an anode, a cathode and a grid; a source of direct current, a resistor, a first and a second code following relay, means to connect the positive terminal of said source to the anode of one of said tubes through said resistor and the winding of said first relay and to the anode of the other tube through said resistor and the winding of said second relay, means to connect the negative terminal of the source to the cathodes of said tubes in parallel, said source ineffective to render either of said tubes conductive, a condenser, means to connect said condenser between said cathodes and the terminal of said resistor remote from the source whereby said condenser is normally charged, input circuits for said tubes connected with the grids and cathodes in a push pull arrangement, means to couple said receiving circuit with said input circuits so that one of the tubes is ionized in response to a current impulse of positive polarity and the other tube is ionized in response to a current impulse of negative polarity, said condenser discharging when either tube ionizes through the winding of the relay associated with that tube to operate that relay and to deionize that tube; and signalling means controlled by said relays to display three different signals, one signal when said first relay is recurrently operated, a second signal when said second relay is recurrently operated and a third signal when said relays are alternately operated.

10. A signal system comprising, transmitting means operative to transmit code impulses of direct current either of positive polarity or of negative polarity according to two different signaling conditions; two electron tubes of the controlled ionization type each having an anode, a cathode and a control element; an input circuit connected with the control elements and cathodes of said tubes in a push-pull arrangement, a source of direct current, means to connect said source of direct current with the anodes and cathodes of said tubes in parallel to form two anode circuits one for each tube, each of said anode circuits normally ineffective to render the respective tube conductive, circuit means to couple said input circuit with said transmitting means to cause a particular one of the tubes to ionize in response to each of said code impulses of current of positive polarity and the other tube to ionize in response to each of said code impulses of current of negative polarity, an energy storing unit connected across the anodes and cathodes of the tubes in parallel to receive energy from said source of direct current when both tubes are non-conductive and to give up such energy when either tube is ionized to reduce the anode potential of such ionized tube and deionize that tube whereby code impulses of current are caused to flow in the anode circuit of the respective tube, and signaling means selectively controlled by the code impulses of current thus caused to flow in one or the other of said anode circuits.

11. A signal system comprising, transmitting means operative to transmit code impulses of direct current either of positive polarity or of negative polarity according to two different signaling conditions; a first and a second electron tube of the controlled ionization type and each having an anode, a cathode and grid; a first winding connected across the grid and cathode of said first tube and a second winding connected across the grid and cathode of said second tube, a first and a second electromagnetic device, a source of direct current connected across the anode and cathode of said first tube over said first electromagnetic device and across the anode and cathode of said second tube over said second electromagnetic device, said source of direct current normally ineffective to render either tube conductive, circuit means to couple said first and said second windings with said transmitting means to cause said first tube to ionize in response to said current impulses of positive polarity only and said second tube to ionize in response to said current impulses of negative polarity only, means including a condenser connected with the anodes and cathodes of said tubes in parallel to charge said condenser from said source of direct current when both tubes are deionized, said condenser discharging when either tube is ionized and made conductive in response to said code impulses of current to deionize the tube thus made conductive, and signaling means controlled to a first or a second position by the current impulses thus caused to flow through said first or said second electromagnetic device.

12. A signal system comprising, transmitting means operative to selectively supply recurrent impulses of direct current of positive polarity or of negative polarity or alternately of positive and negative polarity; two electron tubes of the controlled ionization type each having an anode, a cathode and a control element; an input circuit connected with the control elements and cathodes of said tubes in a push-pull arrangement, a first and a second transformer, a source of direct current having its negative terminal connected with the cathode of each of said tubes and its positive terminal connected with the anode of one tube through the primary winding of said first transformer and with the anode of the other tube through the primary winding of said second transformer, said source of direct current normally ineffective to render either of said tubes conductive; a first, a second and a third relay; said first relay connected across the secondary winding of said first transformer through a first rectifier and said second relay connected across the secondary winding of said second transformer through a second rectifier, means including a contact of each of said first and second relays to control said third relay, circuit means to couple said input circuit to said transmitting means to cause a selected one of said tubes to ionize only for said impulses of current of positive polarity and the other tube to ionize only for said impulses of current of negative polarity, a condenser having one terminal connected with the cathodes of said tubes and its other terminal connected with the anodes of said tubes, said condenser charged from said current source when both tubes are non-conductive and discharging when either tube is ionized to deionize that tube, and signaling means selectively controlled by said relays.

13. A signal system comprising, transmitting means operative to supply recurrent impulses of direct current of positive polarity or recurrent impulses of direct current of negative polarity according to two different signaling conditions; two electron tubes of the controlled ionization type each having an anode, a cathode and a control element; an input circuit including a receiving winding connected with the control elements and cathodes of said tubes in a push-pull arrangement, a first and a second transformer, a source of direct current connected with the cathode and anode of one of said tubes through the primaary winding of said first transformer and with the cathode and anode of the other of said tubes through the primary winding of said second transformer, said source of direct current normally ineffective to render either of said tubes conductive, a first and a second relay, said first relay connected with the secondary winding of said first transformer and said second relay connected with the secondary winding of said second transformer, circuit means to couple said receiving winding to said transmitting means to cause a selected one of said tubes to ionize only for said impulses of current of positive polarity and the other tube to ionize only for said impulses of current of negative polarity, a condenser having one terminal connected with the cathodes of said tubes and its other terminal connected with the anodes of said tubes to charge said condenser when both tubes are non-conductive, said condenser discharging through either tube when a tube is ionized to increase the current impulse flowing in the primary winding of the associated transformer due to said current source to effectively energize the associated relay and said condenser by discharging causing such ionized tube to be deionized, and signaling means selectively controlled by said relays.

WILLARD P. PLACE.